United States Patent
Rand et al.

(10) Patent No.: US 7,926,108 B2
(45) Date of Patent: Apr. 12, 2011

(54) SMTP NETWORK SECURITY PROCESSING IN A TRANSPARENT RELAY IN A COMPUTER NETWORK

(75) Inventors: David L. Rand, Kihei, HI (US); Scott D. Esters, San Francisco, CA (US); Paul M. Moriarty, San Jose, CA (US); Gerald C. Scharf, Palo Alto, CA (US)

(73) Assignee: Trend Micro Incorporated, Tokyo (JP)

( * ) Notice: Subject to any disclaimer, the term of this patent is extended or adjusted under 35 U.S.C. 154(b) by 136 days.

(21) Appl. No.: 11/601,604

(22) Filed: Nov. 17, 2006
(Under 37 CFR 1.47)

(65) Prior Publication Data

US 2007/0204341 A1 Aug. 30, 2007

Related U.S. Application Data

(63) Continuation-in-part of application No. 11/437,912, filed on May 19, 2006.

(60) Provisional application No. 60/814,015, filed on Jun. 15, 2006, provisional application No. 60/739,889, filed on Nov. 23, 2005.

(51) Int. Cl.
*G06F 11/00* (2006.01)

(52) U.S. Cl. ....................................................... 726/22

(58) Field of Classification Search ................ 726/22
See application file for complete search history.

(56) References Cited

U.S. PATENT DOCUMENTS

| 5,623,600 | A * | 4/1997 | Ji et al. ........................... 726/24 |
| 6,092,194 | A | 7/2000 | Touboul |
| 6,195,587 | B1 | 2/2001 | Hruska et al. |
| 6,321,267 | B1 * | 11/2001 | Donaldson ..................... 709/229 |
| 6,938,097 | B1 | 8/2005 | Vincent et al. |
| 7,010,807 | B1 | 3/2006 | Yanovsky |
| 2002/0024964 | A1 * | 2/2002 | Baum et al. .................... 370/419 |
| 2002/0184190 | A1 * | 12/2002 | Sugiura ............................ 707/1 |
| 2003/0135567 | A1 * | 7/2003 | Reilly ........................... 709/206 |
| 2004/0177247 | A1 * | 9/2004 | Peles ............................ 713/155 |
| 2004/0193730 | A1 * | 9/2004 | Vernon ......................... 709/245 |
| 2004/0255161 | A1 * | 12/2004 | Cavanaugh ................... 713/201 |
| 2005/0015455 | A1 * | 1/2005 | Liu ................................ 709/207 |
| 2005/0166268 | A1 * | 7/2005 | Szor ............................... 726/24 |
| 2005/0188035 | A1 * | 8/2005 | Ueno ........................... 709/206 |
| 2005/0204169 | A1 * | 9/2005 | Tonnesen ..................... 713/201 |

(Continued)

OTHER PUBLICATIONS

Keisuke Ishibashi, et al., and Masahiro Ishino, et al., "Detecting Mass-Mailing Worm Infected Hosts by Mining DNS Traffic Data", Aug. 2005, 7 sheets, Sigcomm 2005 Workshops, ACM, PA, USA. ACM, PA, USA.

(Continued)

*Primary Examiner* — Nasser Moazzami
*Assistant Examiner* — Michael S McNally
(74) *Attorney, Agent, or Firm* — Okamoto & Benedicto LLP

(57) ABSTRACT

In one embodiment, a transparent relay receives diverted e-mail communications between an e-mail client and an e-mail server. The transparent relay may be configured to examine the e-mail communications for network security policy violations. E-mail communications that do not violate a network security policy may be relayed to their intended destination. Policy actions, such as discarding or redirection, may be performed on those that violate one or more network security policies. The transparent relay may include a pair of communications interfaces running in promiscuous mode, one for downstream communications and another for upstream communications. The transparent relay may decompose a network communication protocol to look network security policy violations.

12 Claims, 17 Drawing Sheets

U.S. PATENT DOCUMENTS

2006/0085503 A1* 4/2006 Stoye et al. .................. 709/206
2006/0212572 A1* 9/2006 Afek et al. .................. 709/225

OTHER PUBLICATIONS

Antoine Schonewille and Dirk-Jan Van Helmond, "The Domain Name Service as an IDS—How DNS can be used for detecting and monitoring badware in a network", Feb. 5, 2006, pp. 1-24, Surf net, University Van Amsterdam, USA.University Van Amsterdam, USA.

P. Mockapetris, "Domain Names—Implementation and Specification" ISI Nov. 1987, pp. 1-52, [retrieved on Apr. 22, 2006]. Retrieved from the internet<URL:http://www.ietf.org/rfc/rfc1035.txt>.

Simplicita: Carrier Scale Internet Applications Infrastructure, 27 sheets. Webpage [online] [retrieved on Jun. 1, 2006]. Retrieved from the internet<URL:http//www.simplicita.com>.

The Register® Biting the hand that feeds IT "Trend Micro to kick butt on botnets", Sep. 26, 2006, 4 sheets; Webpage [online] [retrieved on Sep. 29, 2006]; Retrieved from the Internet: http://www.theregister.com/2006/09/26/trend_micro_botnet_appliance/print.html.

2006 Press Releases, "Trend Micro Takes Unprecedented Approach to Eliminating Botnet Threats with the Unveiling of InterCloud Security Device", Sep. 25, 2006, 3 sheets; Webpage [online] [retrieved on Sep. 29, 2006]; Retrieved from the Internet: http://www.trendmicro.com/en/about/news/pr/archive/2006/pr092506.htm.

Laura Chappell "Inside the TCP Handshake" Mar. 2000, NetWare Connection, 2 sheets.

Internet Protocols (IP), Dec. 14, 2005, pp. 1-15, Cisco Systems, Inc., webpage [online][retrieved on Sep. 6, 2006]. Retrieved from the internet: http://www.cisco.com.univercd/cc/td/doc/cisintwk/ito_doc/ip.htm.

Jonathan B. Postel "Simple Mail Transfer Protocol", Aug. 1982, pp. 1-68, Information Sciences Institute, University of Southern California, [retrieved on Sep. 21, 2006]. Retrieived from the internet: http://www.ietf.org/rfc/rfc0821.txt.

* cited by examiner

SMTP NETWORK SECURITY PROCESSING IN A TRANSPARENT RELAY IN A COMPUTER NETWORK

CROSS-REFERENCE TO RELATED APPLICATION

This application claims the benefit of U.S. Provisional Application No. 60/814,015, filed on Jun. 15, 2006 and U.S. Provisional Application No. 60/739,889, filed Nov. 23, 2005, both of which are incorporated herein by reference in their entirety.

This application is a continuation-in-part of U.S. application Ser. No. 11/437,912, filed on May 19, 2006, which is incorporated herein by reference in its entirety.

BACKGROUND OF THE INVENTION

1. Field of the Invention

The present invention relates generally to computer networks, and more particularly but not exclusively to computer network security.

2. Description of the Background Art

The widespread accessibility of public computer networks, such as the Internet, has enabled users from around the world to efficiently communicate with one another and access vast amounts of information. For example, a user employing a client computer with a Web browser can log onto the Internet to download files, send and receive e-mails, read web pages from websites, and so on. Unfortunately, the Internet not only attracts legitimate users but those with malicious intentions as well.

Malicious users on the Internet, also collectively referred to herein as "hackers," write and propagate malicious codes, such as computer viruses, worms, Trojans, and spyware, indiscriminately send junk e-mails ("spam"), and perpetuate frauds and denial of service attacks. Hackers also hijack legitimate websites, steal Internet Protocol (IP) addresses, and redirect users to malicious websites. The malicious activities of hackers, and the damages they cause, are well-known. Antivirus (which includes anti-spyware and anti-spam) software and firewall technologies may be employed as protective measures against malicious activities. However, while these protective measures are effective for the most part, they need to be augmented or improved to combat the ever increasing sophistication of hackers.

SUMMARY

In one embodiment, a transparent relay receives diverted e-mail communications between an e-mail client and an e-mail server. The transparent relay may be configured to examine the e-mail communications for network security policy violations. E-mail communications that do not violate a network security policy may be relayed to their intended destination. Policy actions, such as discarding or redirection, may be performed on those that violate one or more network security policies. The transparent relay may include a pair of communications interfaces running in promiscuous mode, one for downstream communications and another for upstream communications. The transparent relay may decompose a network communication protocol to look for network security violations.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

Figure 1:
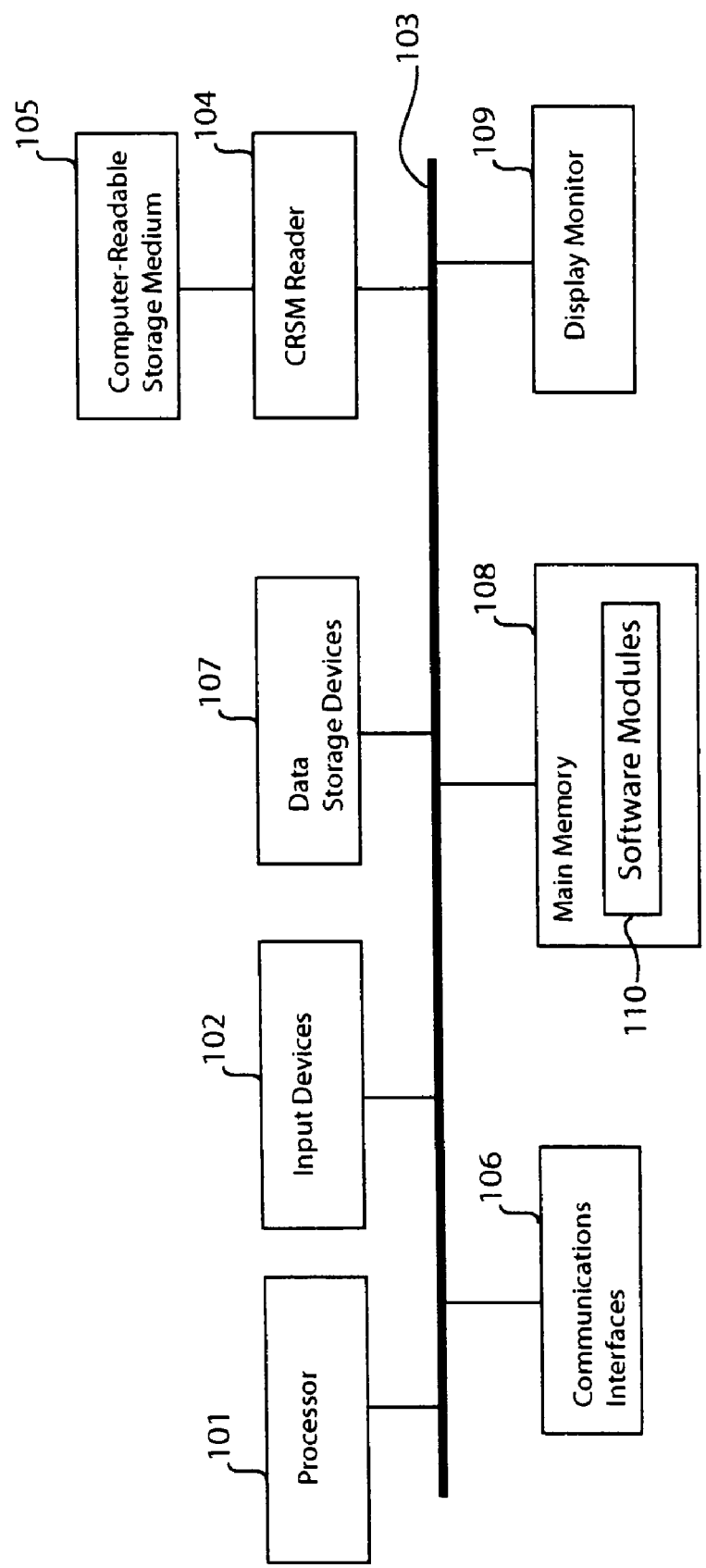
FIG. 1 shows a schematic diagram of an example computer that may be used in embodiments of the present invention.

FIG. 1 shows a schematic diagram of an example computer that may be used in embodiments of the present invention. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., LCD, cathode ray tube, flat panel display), communications interfaces 106 (e.g., network adapters, modems) for communicating over computer networks, one or more data storage devices 107 (e.g., hard disk drive), and a main memory 108 (e.g., RAM). Software embodiments may be stored in a computer-readable storage medium 105 for reading into a data storage device 107 or main memory 108. Software embodiments may also be received over a computer network by way of a communications interface 106. In the example of FIG. 1, main memory 108 includes software modules 110, which may comprise software components of the later described server 260, appliance 210, SMTP transparent relay 710, or HTTP transparent relay 1710. The software modules 110 may be executed by the processor 101.

DNS Processing

Figure 2:
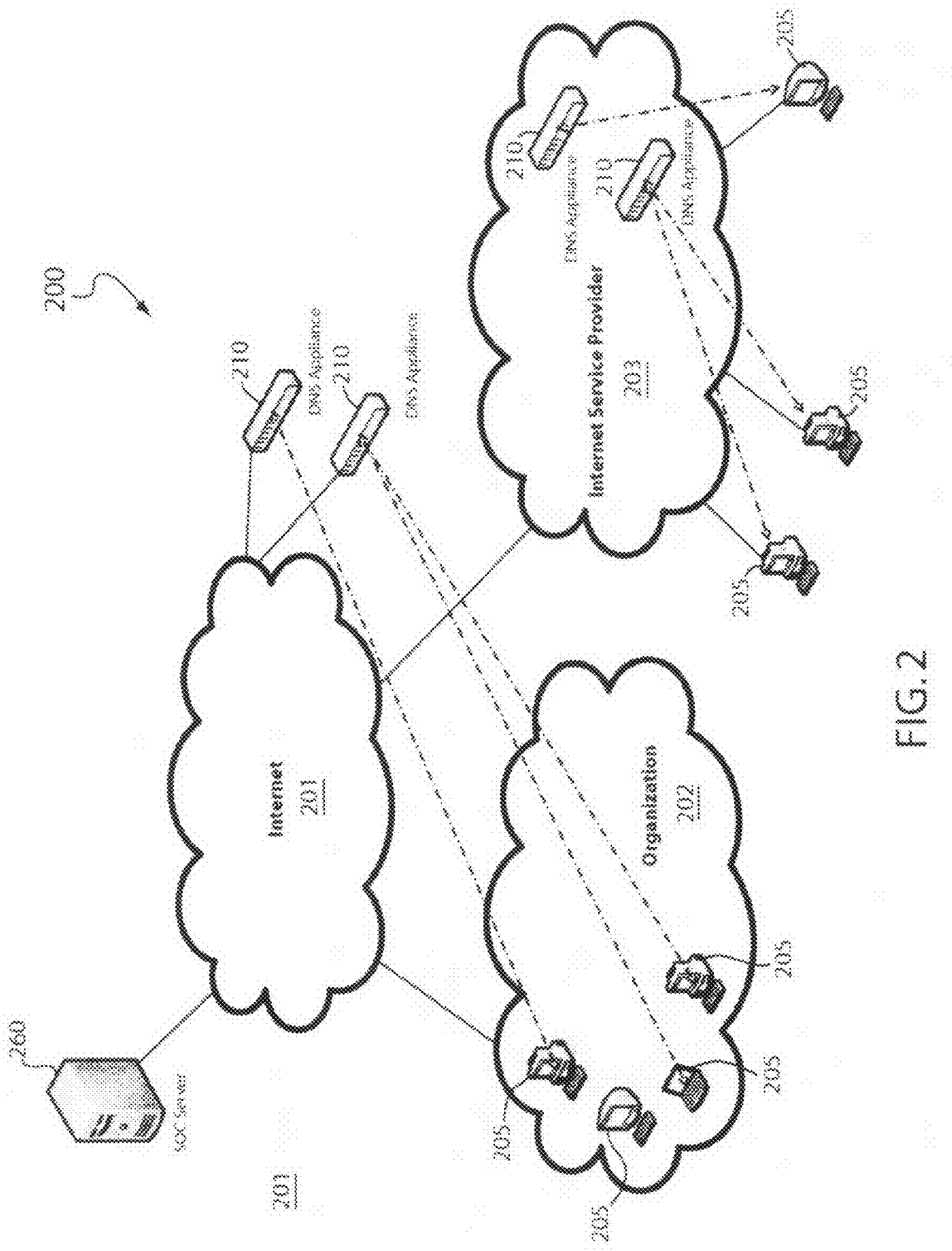
FIG. 2 schematically shows a computer network in accordance with an embodiment of the present invention.

Referring now to FIG. 2, there is schematically shown a computer network 200 in accordance with an embodiment of the present invention. The computer network 200 may include a private computer network 202, a service provider network 203, and a public computer network 201. In this and the following examples, the public computer network 201 comprises the Internet and the service provider 203 comprises an Internet Service Provider (ISP), while the private computer network 202 may be that of any organization, such as a company, government entity, or household. Computers in the network 200 may communicate using the Internet protocol.

A domain name system (DNS) appliance 210 may comprise computer hardware, software, and/or firmware components for providing DNS server functionality to subscribing customer computers 205. As is well known, each computer on the Internet has a particular IP address. Because an IP address is cumbersome for use by humans, DNS has been developed to allow use of a domain name instead of an IP addresses to access a site. This enables a user to access or send data to a computer (e.g., a website or mail server) by typing the computer's domain name instead of its IP address. A DNS server allows for translation of domain names to IP addresses. In the example of FIG. 2, a customer computer 205 may query a DNS appliance 210 to find the IP address for a particular domain name. The dashed lines in FIG. 2 represent logical connections between client computers 205 and DNS appliances 210. As will be more apparent below, a DNS appliance 210 may perform conventional DNS services for legitimate client queries, but may perform alternative actions when the query is from an originator that is performing a prohibited activity. DNS, in general, is well known and described in several documents, including IETF RFC 1034 and 1035.

A security operations center (SOC) server 260 may comprise computer hardware, software, and/or firmware components for supporting the operations of the DNS appliances 210. In one embodiment, the server 260 generates security policies that are enforced by the DNS appliances 210. Such security policies may dictate how to detect and respond to DNS client queries that are part of a prohibited activity, such as activities of malicious sources or activities that are against customer-dictated rules. The server 260 may generate security policies based on data gathered and provided by the DNS appliances 210, externally provided feeds, customer inputs, and other sources of threat-related information. As will be more apparent below, the server 260 may aggregate information from a variety of sources to identify malicious activities, generate security policies to combat identified malicious activities, and distribute the generated security policies to the DNS appliances 210. This advantageously allows for a dynamic, global response to network security threats. In one embodiment, the DNS appliances 210 and the server 260 form a DNS security network system that is provided and operated by a single vendor. As shown in FIG. 2, the vendor may provide the DNS and network security services of the DNS appliances 210 and the server 260 to organizations, Internet service providers, and other customers.

Figure 3:
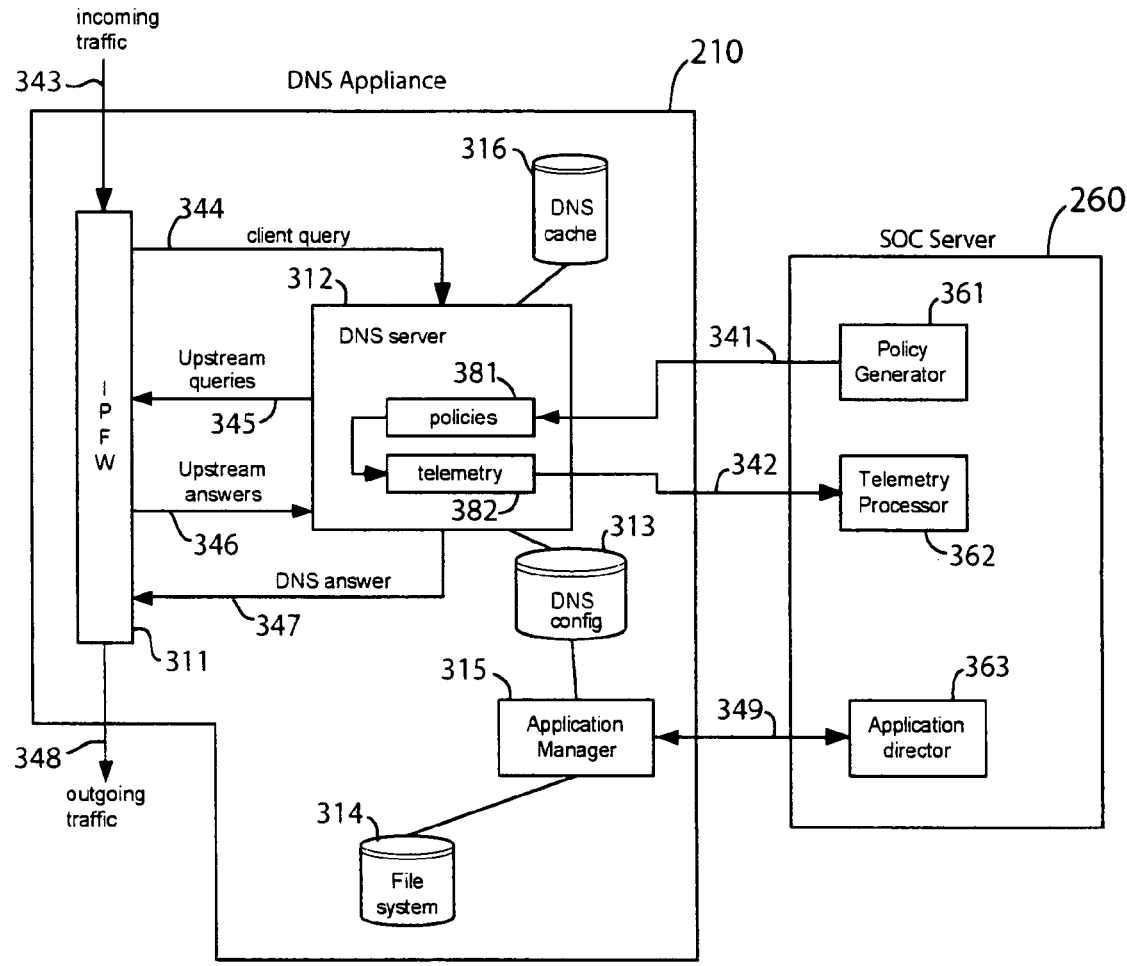
FIG. 3 schematically shows a DNS appliance and a security operations center (SOC) server in accordance with an embodiment of the present invention.

FIG. 3 schematically shows further details of a DNS appliance 210 and a server 260 in accordance with an embodiment of the present invention. In the example of FIG. 3, the DNS appliance 210 comprises an IP firewall (IPFW) 311, a DNS server 312, a DNS configuration 313, a file system 314, an application manager 315, and a DNS cache 316.

The DNS server 312 may comprise computer-readable program code for receiving a DNS client query, for processing the client query based on security policies 381, and for providing telemetry data 382 to the telemetry processor 362 of the server 260. The security policies 381 may be in the form of tables received from a policy generator 361 of the server 260 (see arrow 341). The server 260 may generate the security policies 381 using information from the telemetry data 382 received from the DNS appliance 210 (see arrow 342) and other data sources. In operation, the server 260 receives telemetry data 382 from a plurality of DNS appliances 210, which may be located at various locations throughout the world. A DNS appliance 210 and the server 260 may communicate over the Internet.

The security policies 381 may comprise instructions or information on detecting particular conditions and what to do upon detection of those conditions. In one embodiment, the security policies 381 allow for detection of malicious or prohibited activities. For example, the policies 381 may indicate looking for IP addresses, domain names, or activity patterns associated with or indicative of malicious or prohibited activities and then modifying an answer to the client query if such activities are detected. As another example, a security policy 381 may indicate that if an answer to a client query is an IP address of a malicious site, that answer must be replaced with another answer providing an IP address of a legitimate site. Other examples of policies 381 are provided below. The DNS server 312 enforces the security policies 381 during processing of DNS client queries. The DNS server 312 may enforce the security policies 381 at different stages of processing a DNS client query to take advantage of updated security policies 381 or additional information that is made known as a consequence of processing the query.

In operation, incoming network traffic is received in the DNS appliance 210 by way of the firewall 311 (see arrow 343). The firewall 311 may comprise conventional firewall software. The incoming traffic may include a DNS client query (see arrow 344) from a customer computer 205 (see FIG. 2). The client query may comprise a request to resolve a particular domain name to its associated IP address. More particularly, the client query may contain a request for the "A record" (address record) that contains the IP address of the domain name of interest. The client query may indicate the domain name of interest and the type of resource information desired (e.g., IP address of a mail exchange or Internet web site). An answer to the client query may comprise the IP address of the domain name indicated in the query.

The DNS server 312 may determine an answer to the client query by first inspecting its DNS cache 316, which may comprise a cache of previously generated answers to processed client queries. The DNS cache 316 may be maintained in the memory of the DNS appliance 210 for performance reasons.

If the DNS cache 316 does not contain an answer to the client query, the DNS server 312 may find the answer by sending upstream queries to remotely located recursive or non-recursive DNS servers (see arrow 345), which are collectively referred to herein as "upstream DNS servers." An answer from an upstream DNS server (see arrow 346) may tell the DNS server 312 the IP address of the domain name of interest or information on another upstream DNS server that may know more information about the domain name of interest. The DNS server 312 may continue recursively sending queries to upstream DNS servers and receiving corresponding answers until it receives a "final answer," which provides the IP address of the domain name of interest. The DNS server 312 provides the final answer (see arrow 347) to the originator of the client query (i.e., the customer computer 205 that sent the client query) if it is not against a security policy 381 to do so. Outgoing traffic, such as answers and upstream queries, from the DNS appliance 210 is represented in FIG. 3 by the arrow 348.

Still referring to FIG. 3, the DNS configuration 313 may comprise computer-readable data providing configuration information to the DNS appliance 210. This configuration information may include the IP addresses of customer computers 205 authorized to send DNS client queries to the DNS appliance 210, ports to listen on, listing of root or authoritative name servers, and other configuration/setup-related information. The DNS appliance 210 may receive configuration information from the application director 363 of the server 260 (see arrow 349) by way of the application manager 315. In the example of FIG. 3, the arrows 341, 342, and 349 represent Internet connections between the DNS appliance 210 and the server 260.

The application manager 315 may comprise computer-readable program code for managing applications in the DNS appliance 210. In one embodiment, the application manager 315 facilitates receipt of configuration information from the server 260. The application manager 315 may also control orderly shutdown and boot-up of the DNS appliance 210. The example of FIG. 3 shows the DNS server 312 as the only application running in the DNS appliance 210. It should be understood, however, that the DNS appliance 210 may also run other applications without detracting from the merits of the present invention.

The file system 314 allows for non-volatile data storage in the DNS appliance 210. The operating system components (e.g., FreeBSD operating system) of the DNS appliance 210, the DNS configuration 313, and other data or program code may be stored in and loaded from the file system 314.

Figure 4:
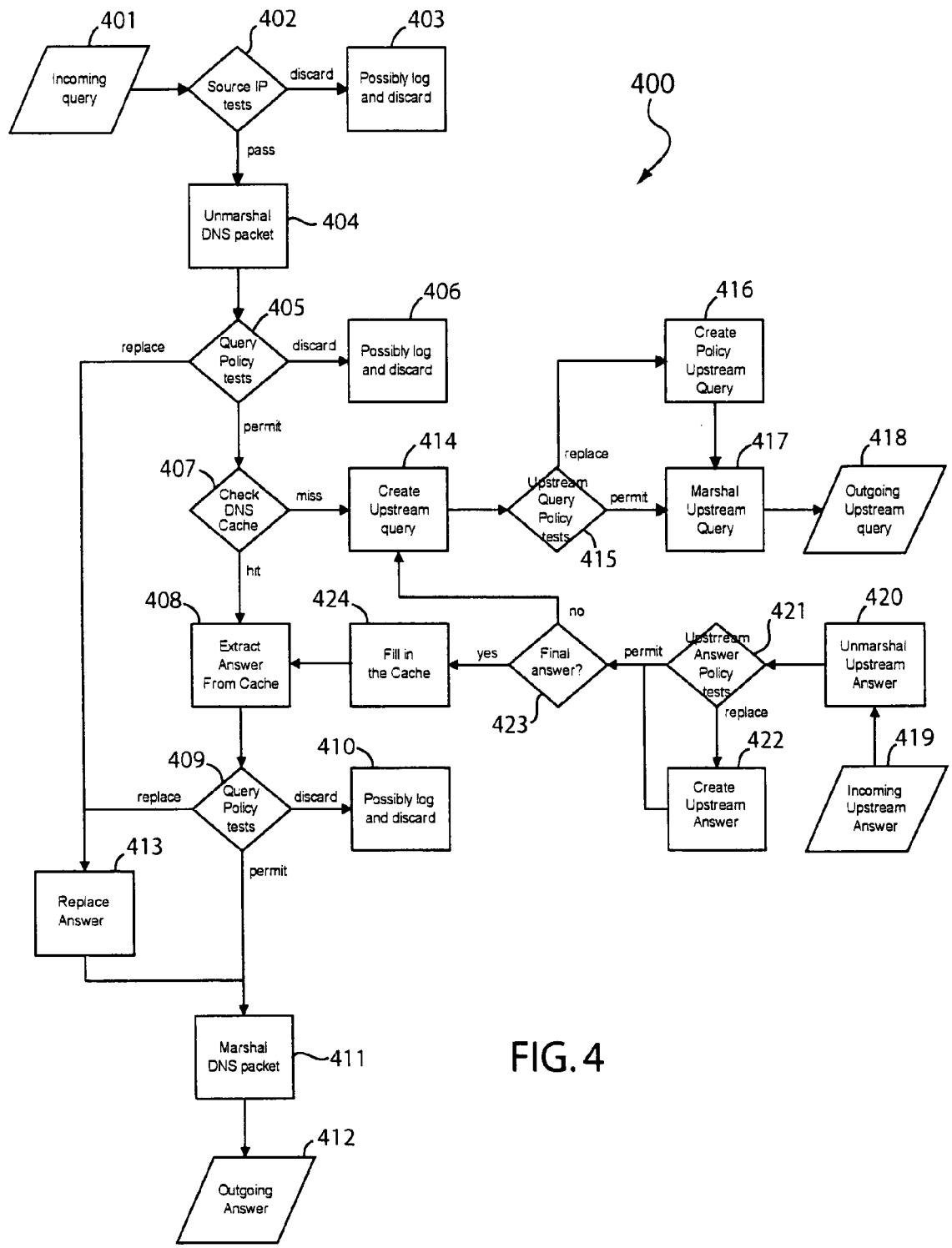
FIG. 4 shows a flow diagram of a method of responding to DNS client queries in accordance with an embodiment of the present invention.

FIG. 4 shows a flow diagram of a method 400 of responding to DNS client queries in accordance with an embodiment of the present invention. The method 400 may be performed by the DNS appliance 210.

The DNS appliance 210 receives an incoming DNS client query (see 401) from a customer computer 205 by way of the firewall 311 (shown in FIG. 3). The DNS server 312 checks the source IP addresses of one or more packets forming the client query (step 402). The DNS server 312 may either discard (to step 403) or continue processing of the client query (to step 404) based on one or more security policies 381. For example, a security policy 381 may indicate that only queries from particular IP addresses (e.g., those of authorized customer computers 205) may be processed, and client queries from any other IP addresses are to be discarded. As another example, a security policy 381 may indicate that client queries from IP addresses of known malicious sources should be logged for later reporting to the server 260 as telemetry data 382, and then discarded.

If the client query passes the source IP address test (see step 402), packets of the client query are unmarshaled by the DNS server 312 into a format supported by the DNS server 312 (step 404). The DNS server 312 then performs a first policy test (step 405) of several policy tests configured to determine whether the query is from a malicious source or would result in a prohibited action (e.g., navigation to a porn website by a company computer or a computer used by young children). That is, in essence, the first and subsequent policy tests checks the client query to determine if the originator of the client query is performing a prohibited (e.g., malicious or unauthorized) activity.

Each of the policy tests uses the then available information about the client query. As the processing of the client query continues, more information about the client query is known and accordingly checked against the security policies 381 at different stages of the processing. The policy tests may be updated in real time by receiving new or security policies 381 from the server 260 (see arrow 341 of FIG. 3) to allow for fast response against malicious threats as more information about them is discovered by the DNS appliance 210 during processing of the client query or by other DNS appliances 210 in the DNS security network. The security policies 381 may be different for different customers and thus accordingly identified. When a policy test is performed, the DNS appliance 210 may select the appropriate security policy 381 for the particular customer as identified by the client query's source IP address. Some security policies 381 may also be identified as global and thus applied to all client queries. The policy tests are referred to herein as first, second, etc. for ease of reference, and may be performed in different order depending on the application.

The first policy test (step 405) checks the client query for compliance with the security policies 381 using information about the client query as originally received in the DNS appliance 210. As originally received by the DNS server 312, the client query includes the source IP address of the customer computer 205 from which the client query came and the domain name of interest. In one embodiment, the first policy test checks the client query for compliance with customer-provided (see customer portal 505 of FIG. 5) security policies 381, such as restrictions on accessing web pages from particular websites, restrictions on sending e-mails to particular domain names, policy against sending of e-mails from a particular customer computer 205, and other policies a customer wants enforced. The DNS server 312 may replace an answer to the client query (to step 413), discard the client query (to step 406), or permit continued processing of the client query (to step 407) depending on the result of the first policy test.

The DNS server 312 may replace an answer to the client query if the first policy test indicates that the client query violates a security policy 381 and the security policy 381 dictates replacement of the answer (step 413). "Replacing an answer" means responding to the client query with an answer other than that that would result by normally processing the client query in accordance with established DNS processing standards as promulgated by the Internet Engineering Task Force (IETF) or other standard setting body. For example, if the answer to the client query includes an IP address of a prohibited website, the answer my be replaced with an IP address of a web page warning the user of the customer computer 205 that accessing web pages from the prohibited website is against company policy. As another example, if the answer includes an IP address of a known virus-infected website, the answer may be replaced with an IP address of a website that may perform a "house call" to disinfect the originator of the client query (i.e., customer computer 205 that originally sent the client query), which may already have been infected by the virus.

The DNS server 312 may discard the client query if the first policy test indicates that the client query violates a security policy 381 and the security policy 381 dictates discarding of the client query (step 406). The DNS server 312 may log the client query for telemetry data 382 collection purposes before discarding (e.g., stop further processing and delete from queue) the client query. A security policy 381 may dictate discarding client queries for a variety of reasons, including when the client query will involve going to a prohibited or infected computer and the customer prefers to simply discard the client query in that case.

If the client query passes the first policy test, the DNS server 312 checks the DNS cache 316 (see FIG. 3) for the answer (step 407). If the DNS cache 316 has the answer to the client query (i.e., a cache hit), the DNS server 312 extracts the answer from the DNS cache 316 (step 408) and performs a second policy test on the answer (step 409).

The second policy test (step 409) checks the client query for compliance with the security policies 381 using available information about the client query, which now additionally includes the "final answer" to the client query. The second policy test now has additional information about the client query and can take advantage of this additional information. For example, the second policy test may check the answer for IP addresses that may have been hijacked or belonging to known malicious computers. The second policy test may further check the answer for IP addresses that together with the client query and other client queries previously received by the DNS server 312 indicate that the originator of the client query itself is malicious. This may be due to the customer computer 205 that sent the query having been turned into a "zombie" or being controlled by malicious code, for example. This may also be due to an IP address of an authorized customer computer 205 being stolen or otherwise maliciously obtained. Malicious behavior may be indicated in a security policy 381 for reference by the DNS server 312. For example, a security policy 381 may indicate that an unreasonable amount of client queries from a single customer computer 205 for IP addresses of mail exchange servers within a short period of time may be deemed as coming from a malicious source (e.g., spammer or hacker performing a directory harvest attack or bounce-source attack). The second policy test may also repeat the first policy test because the security policies 381 used by the first policy test may have been updated by the server 260.

The DNS server 312 may replace the answer to the client query (step 413) if the second policy test (step 409) indicates that the client query violates a security policy 381, and the security policy 381 dictates replacement of the answer (step 413). For example, if the answer to the client query includes an IP address of a computer that is known to be spreading viruses, has been hijacked or taken over by malicious code (e.g., part of botnet), is operating as a phishing site, etc. the answer my be replaced with an IP address of a web page warning the user.

If the second policy test indicates the client query is part of malicious activity, the DNS server 312 may also replace the IP address in the answer with an IP address of a security site that may monitor the malicious activity for purposes of developing an antidote, creating a more reliable behavioral or signature pattern, collecting data (e.g., identify a control host for zombie computers), and so on. The security site may be a computer serving as a honey pot of an antivirus research facility, such as the TrendLabs™ global antivirus and research facility of Trend Micro, Inc., for example.

The DNS server 312 may discard the client query if the second policy test indicates that the client query, which now includes an answer, violates a security policy 381 and the security policy 381 dictates discarding of the client query (step 410). The DNS server 312 may log the client query for telemetry data 382 collection purposes before discarding the client query. A security policy 381 may dictate discarding client queries for a variety of reasons, including when originator of the client query is a malicious source with no known antidote at the moment, the answer points to a prohibited or infected site, and other reasons.

If the client query passes the second policy test, the DNS packets comprising the answer are marshaled (step 411) to put them in a standard form suitable for DNS communications. The answer (labeled as 412 in FIG. 4) is then forwarded to the originator of the client query.

It is possible that the DNS cache 316 does not contain an answer to the client query (i.e., a DNS cache miss; see step 407). In that case, the DNS server 312 may create an upstream query (step 414) to find the answer to the client query. In one embodiment, the DNS appliance 210 is configured to have at least one trusted, authoritative name server to send upstream queries.

A third policy test (step 415) checks the upstream query for compliance with the security policies 381 using available information about the client query, which may now additionally include a list of DNS servers. It is to be noted that the third policy test may be performed in several cycles of upstream queries and upstream answers. Therefore, the upstream query may now additionally include a list of DNS servers (recursive, root, or name DNS servers) involved in getting the final or intermediate (i.e., upstream answers before the final answer). The third policy test may check the upstream query for IP addresses of known malicious DNS servers, such as those operated, hijacked, or compromised by hackers.

If the third policy test (step 415) indicates the upstream query violates a security policy 381, and the security policy 381 dictates replacement of the upstream query, the DNS server 312 may replace the upstream query with a replacement upstream query (416) directed to a trusted (i.e., known good) DNS server. The replacement upstream query may be sent to the trusted DNS server to continue finding an answer to the client query.

The packets forming the upstream query (labeled as 418) are marshaled and sent to their destination upstream DNS server indicated in the upstream query (step 417). It is to be noted that at this point, the upstream query may be a replacement upstream query if it failed the third policy test (see path from step 415, to 416, then to 417).

Packets forming the upstream answer (labeled as 419) to the upstream query are marshaled (step 420) for processing by the DNS server 312. The upstream answer may come from the upstream DNS server to which the upstream query (see label 418) was sent.

A fourth policy test (step 421) checks the upstream answer for compliance with the security policies 381 using available information about the client query, which may now include the IP address of another DNS server with information on the answer or the final answer containing the IP address of the domain name of interest. The fourth policy test may check the upstream answer for IP addresses of known malicious or compromised DNS servers.

If the fourth policy test (step 421) indicates the upstream answer violates a security policy 381, and the security policy 381 dictates replacement of the upstream answer, the DNS server 312 may replace the upstream answer with a replacement upstream answer (step 422). The replacement upstream answer may include the IP address of a trusted DNS server, a web page informing the user the situation, or a security site serving as a honey pot of an antivirus research facility (for tracking or investigation). For example, if the originator of the query is found to be part of a phishing scam (e.g., tricking users to give sensitive information by misrepresentation), the replacement answer may give the IP address of a security site, instead of the control computer for the phishing, to gather more information about the scam. Otherwise, the upstream answer is permitted to be further processed (to step 423) if it passes the fourth policy test.

If the upstream answer is the final answer and contains the IP address of the domain name of interest (step 423), the upstream answer is entered into the DNS cache 316 (step 424), extracted from the DNS cache 316 (step 408), and further tested in the second policy test (step 409) before being marshaled (step 411) and forwarded to the originator of the client query as appropriate. Otherwise, if the upstream answer is not the final answer (step 423), another upstream query is created and the cycle continues until a final answer is obtained (step 414).

Figure 5:
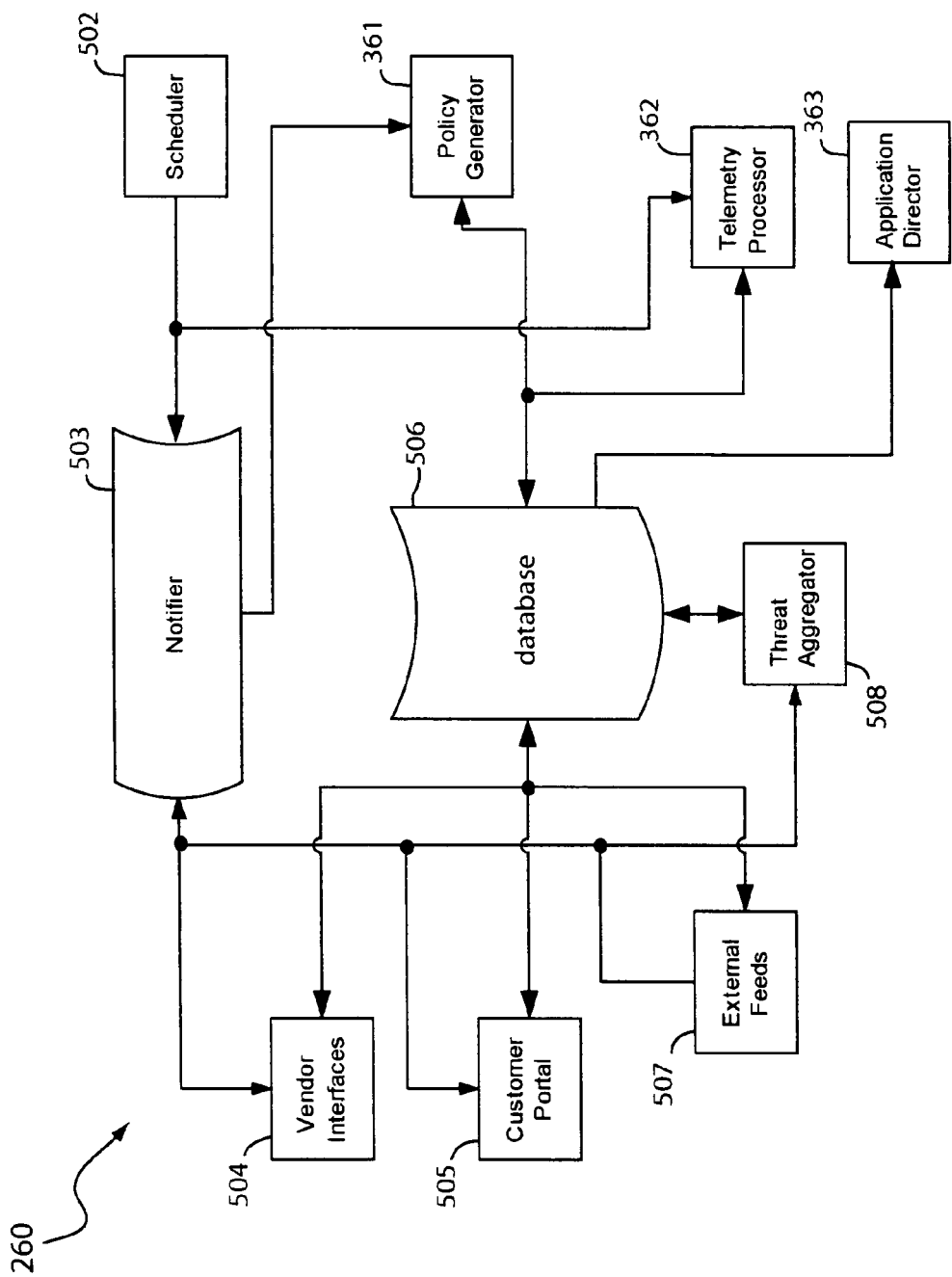
FIG. 5 schematically shows details of an SOC server in accordance with an embodiment of the present invention.

Referring now to FIG. 5, there is schematically shown details of the SOC server 260 in accordance with an embodiment of the present invention. In the example of FIG. 5, the SOC server 260 includes the policy generator 361, the telemetry processor 362, the application director 363, a scheduler 502, a notifier 503, vendor interfaces 504, a customer portal 505, a database 506, external feeds 507, and a threat aggregator 508.

The database 506 may comprise a commercially-available database, such as the PostgreSQL database. The database 506 provides data storage and retrieval facilities for the server 260. The database 506 is depicted as a single database in the example of FIG. 5, but may comprise two or more databases. A script or other computer-readable program code may be employed to format information from the vendor interfaces 504, the customer portal 505, the external feeds 507, and the threat aggregator 508 into one or more tables, each of which may be processed by the policy generator 361 to form corresponding security policies 381.

The telemetry processor 362 may comprise computer-readable program code for receiving telemetry data 382 from the DNS server 312 of the DNS appliance 210 (see FIG. 3) and storing the received telemetry data 382 in the database 506. In one embodiment, the telemetry processor 362 retrieves data collection rules from the database 306. Such data collection rules may identify the kinds of telemetry data 382 to be collected as specified by customers via the customer portal 505, by personnel of the vendor (i.e., operator and provider of the DNS security network) via the vendor interfaces 504, or by data collection configuration data stored in the database 306. For example, the data collection rules may indicate storage and processing of telemetry data 382 that includes specific information such as: DNS cache hit rates, amount of free memory, received client queries, answers to client queries, received upstream answers, DNS servers involved in getting an answer, violations of security policies 381, and/or other information to be logged in the database 506. The telemetry processor 362 may buffer all received telemetry data 382 into the database 506 and then remove from the database 506 those not meeting a data collection rule.

The application director 363 may comprise computer-readable program code for providing configuration information to the application manager 315 of the DNS appliance 210. As mentioned, this configuration information may include the IP addresses of customer computers 205 authorized to send DNS client queries to the DNS appliance 210, ports to listen on, listing of root or authoritative name servers, and other configuration/setup-related information. Configuration information may be entered in the database 506 by customers using the customer portal 505 or by vendor personnel using the vendor interfaces 504, for example. Configuration information may be unique to a group of DNS appliances 210 of a particular customer or to individual DNS appliances 210. The application director 363 may retrieve configuration information from the database 506 for download to a DNS appliance 210 upon request from a corresponding application manager 315, which acts as an agent for the application director 363.

The vendor interfaces 504 may comprise hardware and software components for allowing the vendor to control the operation of components of the DNS security network. In one embodiment, the vendor interfaces 504 comprise a secured communication link to allow vendor personnel to access the server 260 to specify collection of particular telemetry data 382 from a specified or all DNS appliances 210, to stop allowing particular customer computers 205 (e.g., of customers whose subscription has expired and not renewed) from accessing corresponding DNS appliances 210, to enter new tables of information into the database 506 for use as security policies 381, and other vendor-related actions.

The customer portal 505 may comprise hardware and software components for allowing a customer subscribing to the DNS security network to access the server 260 to enter configuration information (e.g., IP addresses of authorized customer computers 205) and security policies information (e.g., what security policy 381 to enforce and what to do if the security policy 381 is violated), and to view account information (e.g., billing, subscription duration). The customer portal 505 may provide web pages for data entry and viewing. For example, a customer with a web browser may navigate to a security policy entry web page of the customer portal 505 to indicate IP addresses of customer computers 205 not authorized to access prohibited websites and, when one of those customer computers 205 accesses a prohibited website, to specify redirection to a web page informing the user of the violation. Information entered into the security policy entry web page may be stored in the database 506 as a table for subsequent processing by the policy generator 361. Security policies 381 generated from customer inputs may be identified by a customer number (or other identification) so that they may be applied only against client queries from customer computers 205 of the particular customer.

The external feeds 507 may comprise hardware and software components for receiving threat-related information from sources other than the DNS security network. For example, a real-time black hole list ("RBL") of IP addresses of known malicious sources may be received by way of the external feeds 507. The real-time black hole list may come from a DNS reputation server, such as that from the Mail- Abuse Prevention System of Trend Micro, Inc., for example. As another example, a listing of known hijacked or stolen IP addresses may also be received over the external feeds 507. These IP addresses may be entered into the database 506 in the form of tables for later processing by the policy generator 361.

The threat aggregator 508 may comprise computer-readable program code for analyzing tables and telemetry data 382 stored in the database 506 to identify network security threats and to generate corresponding new tables for subsequent processing by the policy generator 361. The threat aggregator 508 may employ data mining and/or fraud analysis techniques to identify malicious activities that may otherwise be undetected if not for the capability of the server 260 to obtain telemetry data 382 from several DNS appliances 210 located in separate locations. The threat aggregator 508 may look for patterns of behavior indicative of malicious activity. For example, the threat aggregator 508 may be configured to be on the lookout for an excessive amount of client queries for the IP address of a particular domain, the client queries being received in a single DNS appliance 210 or several DNS appliances 210. Such a behavior is indicative of the client queries being from customer computers 205 that have been taken over by spyware, which tries to find the IP address of its malicious control server. As another example, the threat aggregator 508 may be configured to be on the lookout for excessive client queries for the IP addresses of mail exchange servers from a single customer computer 205, because such a behavior is indicative of a customer computer 205 being used to send spam. Once it identifies malicious activity by aggregating information stored in the database 506, the threat aggregator 508 may generate corresponding tables for subsequent processing by the policy generator 361.

The policy generator 361 may comprise computer-readable program code for retrieving policy-related tables (e.g., tables created by/from the vendor interfaces 504, customer portal 505, external feeds 507, and threat aggregator 508) from the database 506 and converting the tables into a format suitable for distribution as security policies 381. The policy generator 361 may forward the security policies 381 to the DNS appliances 210.

The notifier 503 may comprise computer-readable program code for forwarding instructions and/or notifications from one component of the server 260 to another. The notifier 503 provides a one-to-many and one-to-one notification function.

The scheduler 502 may comprise computer-readable program code for scheduling events in the server 260. For example, the scheduler 502 may be configured to periodically alert the policy generator 361 to send security policies 381 (if any are available) to the DNS appliances 210.

Figure 6:
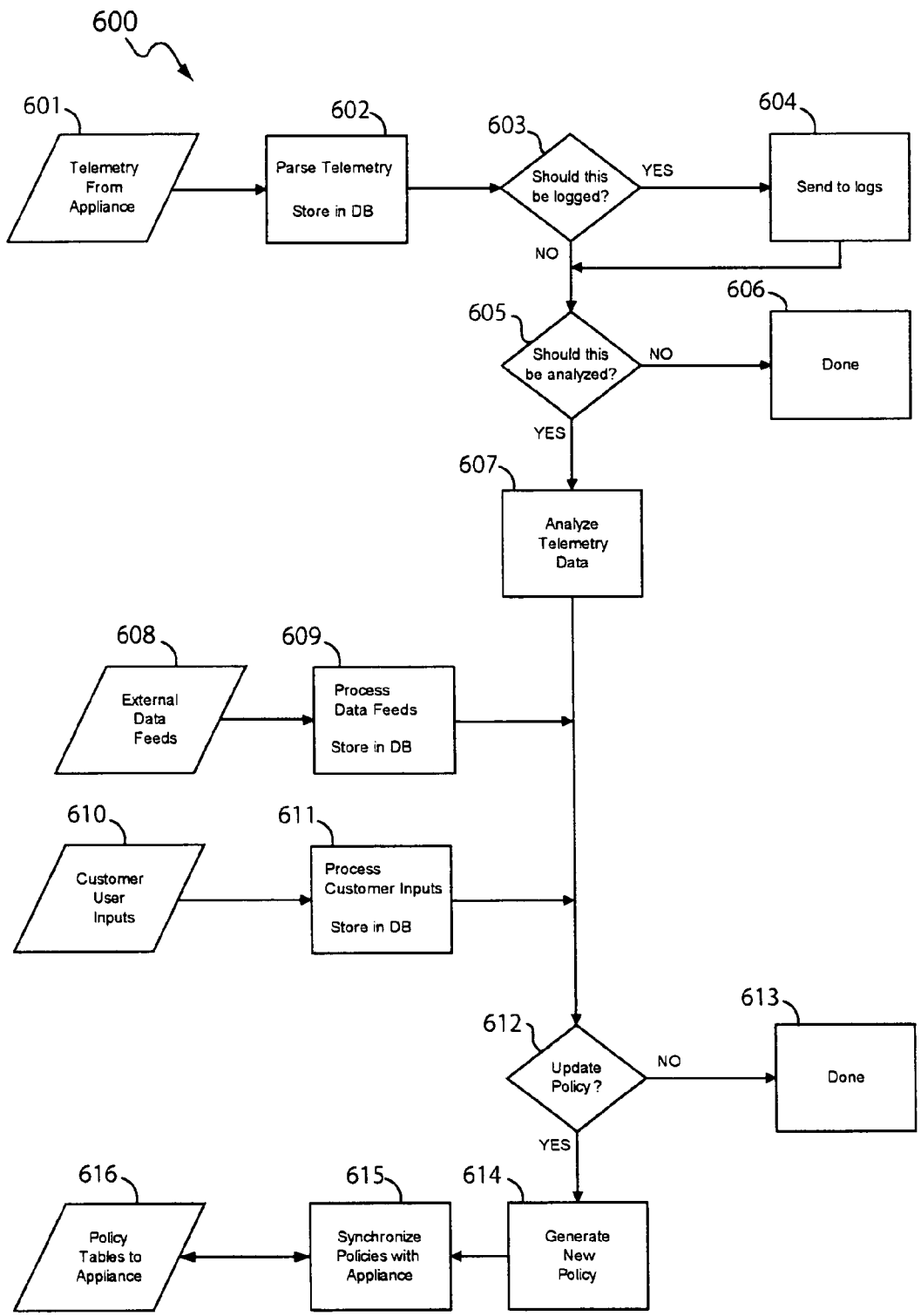
FIG. 6 shows a flow diagram of a method performed by an SOC server in accordance with an embodiment of the present invention.

FIG. 6 shows a flow diagram of a method 600 performed by an SOC server in accordance with an embodiment of the present invention. The method 600 is explained using previously described components of DNS appliances 210 (see FIG. 3) and the SOC server 260 (see FIG. 4). Other components may also be used without detracting from the merits of the present invention.

In the method 600, telemetry data 382 (labeled as 601 in FIG. 6) are received by the telemetry processor 362 from one or more DNS appliances 210. The telemetry processor 362 stores the telemetry data 382 in the database 506 and parses the telemetry data 382 (step 602) to determine if they should be logged according to telemetry data collection rules (step 603). If the telemetry data 382 are to be logged, an entry indicating receipt of the telemetry data 382 are noted in a log (step 604) in the database 506. If the collection rules indicate that the telemetry data 382 should be analyzed (step 605), the threat aggregator 508 inspects the telemetry data 382 (step 607) for information that by itself or when combined with other information stored in the database 306 is indicative of malicious activity. If the threat aggregator 508 identifies malicious activity, the threat aggregator 508 may generate a table containing information for identifying the malicious activity and what to do when the malicious activity is detected.

External data feeds (labeled as 608 in FIG. 6) are received by way of the external feeds 507 for storage in the database 506 (step 609). Similarly, customer inputs (labeled as 610 in FIG. 6) are received by way of the customer portal 505 for storage in the database 506 (step 611). The policy generator 361 checks the database 506 for information that may be used to make a new or updated security policy 381. If such information is available in the database 506 (step 612), the policy generator 361 generates a new or updated security policy 381 (step 614) and synchronizes security policies with the DNS appliances 210 (step 615) by forwarding them the new or updated security policy 381 (labeled as 616 in FIG. 6). Otherwise, if the database 506 does not contain new information that will result in a new or updated security policy 381, the SOC server 260 continues collection of threat-related information as before.

SMTP Processing

The above-described behavioral analysis may be extended to other network protocols that can be measured, analyzed, and controlled in ways similar to DNS. For example, behavioral analysis to perform policy enforcement may be used in the processing of e-mails, such those communicated using SMTP (Simple Mail Transfer Protocol).

Although e-mail provides a cost efficient and fast means of communication, e-mail delivery has introduced a myriad of network security issues. Foremost of these are unwanted e-mail messages (spam) and worms. A less well known but very serious threat is using e-mail as a covert channel.

Spam is unwanted, unsolicited e-mail indiscriminately sent by malicious individuals, who are referred to as "spammers." The delivery of spam has shifted greatly over the years. First, central servers were sending spam. These were combated with "black lists." Next was the use of "open mail relay" systems, which have been combated with more black list functions. Currently, the primary method for delivering spam is to use centrally controlled compromised computers, referred to as "bots," to send the spam. This is somewhat mitigated by black lists for networks that should not be expected to make direct SMTP connections, but this only provides partial coverage. A difficulty with black lists is the fact that e-mail is a store and forward technology. Once an intermediate system has accepted the message for forwarding, much of the information about the original sender is lost. This makes creation and maintenance of a relatively accurate blacklist difficult.

There have also been efforts to distinguish spam from legitimate e-mail by examining the e-mail content. This has become an interesting play and counter-play process. As soon as spammers discover a new analysis technique being used to block spam by content, they re-engineer spam messages to pass through. Given there is no incremental cost to spammers using bots to send spam, sending out 5 or 50 variants to pass through the various content filters is common.

Detecting worms and other malicious codes in e-mails, as well as fraudulent schemes like phishing, is currently done in a way similar to scanning files for viruses. This primarily consists of scanning the e-mail's message content and attachment using complex pattern matching tables stored in pattern files. While generally successful in finding malicious codes in e-mails, pattern matching algorithms constantly need updated pattern files to detect and remove new malicious codes. This usually leaves a window of time between when a new malicious code is released and when a new pattern file is deployed. With fast spreading malicious codes, this can be far too long a time.

Furthermore, current e-mail message scanning techniques provide no protection against covert channels. Covert channels are situations where a common data communications method is used to hide secret information that would otherwise not be permitted. Since the idea is to make them undetectable, covert channels are designed to bypass pattern matching algorithms. There is also the problem that not all of the communications between end nodes are seen by the message scanner. Worse, with timing covert channels, the data is inconsequential and only the relative arrival time carries the secret information.

Figure 7:
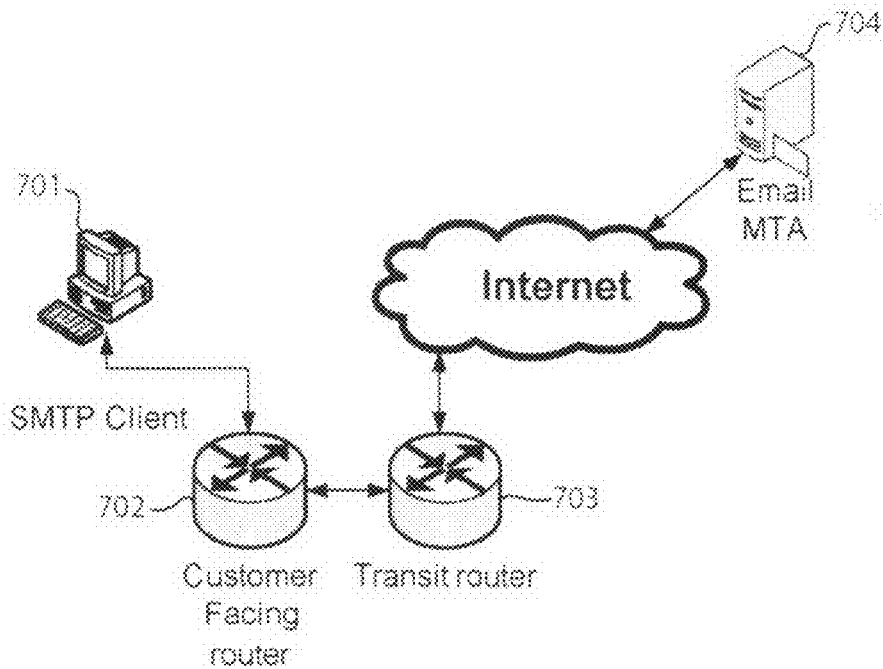
FIG. 7 schematically shows a typical connection path between an SMTP e-mail client and an e-mail mail transfer agent.

To measure, analyze, and control e-mail messages, the e-mail must first be passed through a computer that can perform the requisite processing. FIG. 7 schematically shows the typical connection path between an SMTP e-mail client 701 and an e-mail MTA (mail transfer agent) 704. In the example of FIG. 7, the e-mail client 701 and the MTA 704 communicate over the Internet. A customer facing router 702 belongs to the same private computer network as the e-mail client 701, while the transit router 703 may be one of many routers on the Internet. In the example of FIG. 7, the MTA 704 may send an e-mail to the e-mail client 701 by way of the Internet, the transit router 703, and customer facing router 702.

Figure 8:
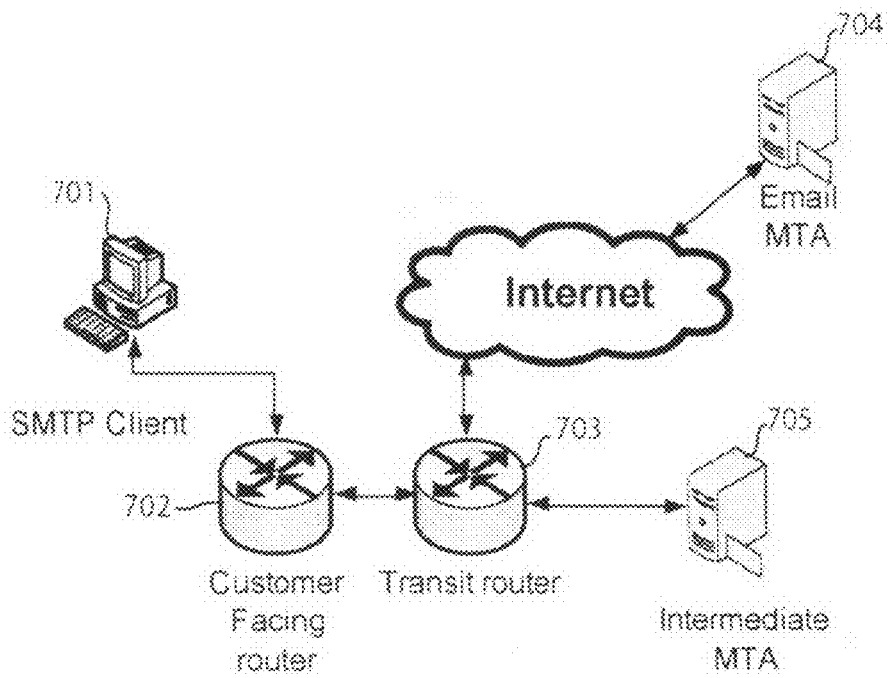
FIG. 8 schematically shows an example system for intercepting e-mail communications for network security processing.

FIG. 8 schematically shows one way of intercepting e-mail for network security processing. In the example of FIG. 8, the e-mail client 701, the MTA 704, or both are configured to use an intermediate MTA 705, where e-mails may be processed for network security purposes. E-mails may be forwarded to the intermediate MTA 705 by using e-mail addresses that go to the intermediate MTA 705 or by using a DNS server that redirects traffic to the intermediate MTA 705. In the example of FIG. 8, the customer facing router 702 and the transit router 703 perform conventional routing functions as in FIG. 7.

One problem with using a full-blown MTA, such as the intermediate MTA 705, to intercept e-mail messages for network security processing is that e-mail senders must be configured to send e-mails to the intermediate MTA. This makes it difficult to use the intermediate MTA to process e-mails for networks that use a variety of MTA's. For example, while an intermediate MTA may be suitable for a corporate network, the intermediate MTA may not be appropriate for Internet service providers. Another problem with using an intermediate MTA is that the intermediate MTA is not discrete and is easily identifiable. This makes the intermediate MTA vulnerable to network attacks.

Figure 9:
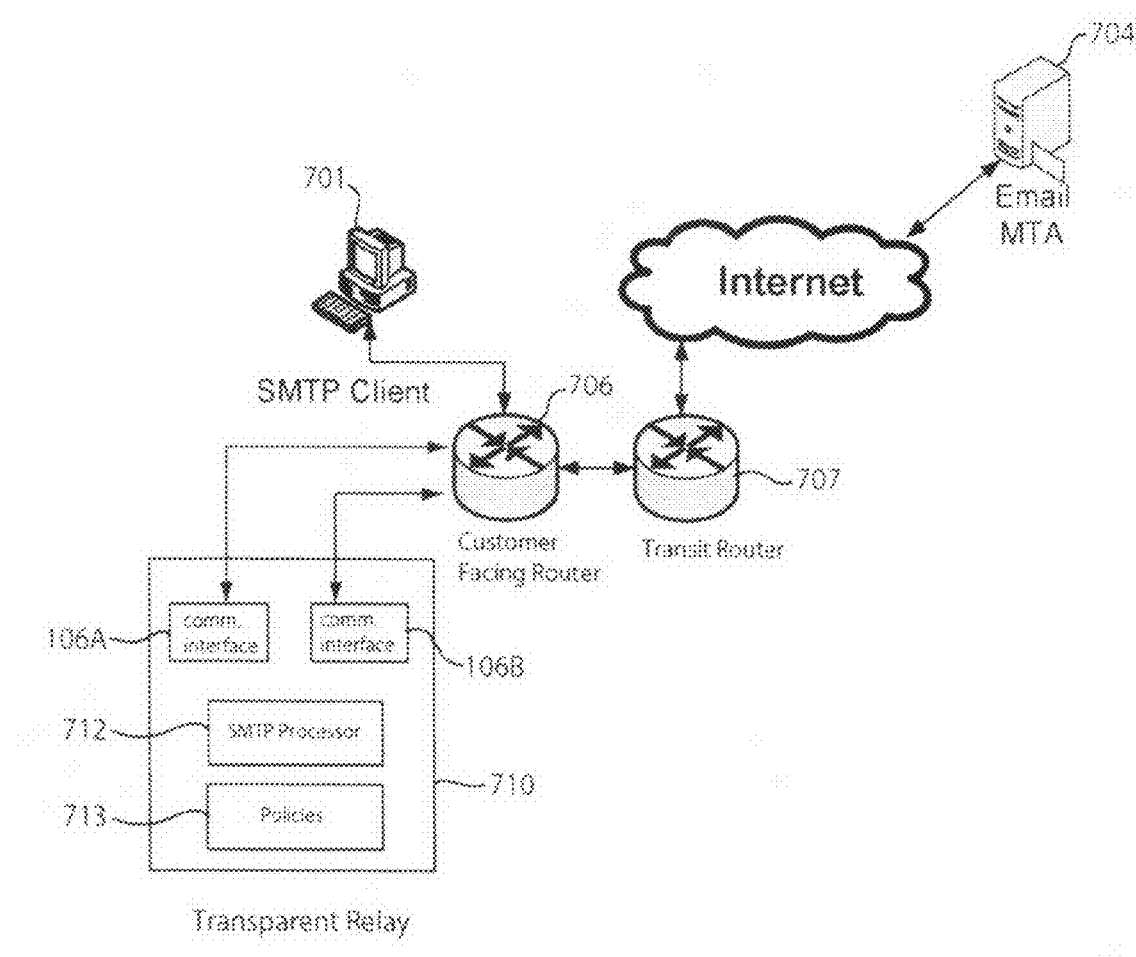
FIG. 9 schematically shows an e-mail processing system in accordance with an embodiment of the present invention.

FIG. 9 schematically shows an e-mail processing system in accordance with an embodiment of the present invention. In the system of FIG. 9, an SMTP transparent relay 710 is employed to receive e-mails for network security processing. As will be more apparent below, the transparent relay 710 is so named because it operates discretely and transparently without requiring reconfiguration of either the e-mail client 701 or the MTA 704. The transparent relay 710 may thus be used with a wide variety of MTA's and e-mail clients.

In the example of FIG. 9, the e-mail client 701 and the MTA 704 communicate over the Internet, with their network traffic being routed by a transit router 707, the customer facing router 706, and other network routers and nodes not specifically shown. The customer facing router 706 may be part of the same private computer network as the e-mail client 701. In the example of FIG. 9, the router 706 is configured to divert to the transparent relay 710 all packets passing through the router 706 and destined to or coming from a designated port number of a software process for e-mail processing. In one embodiment, the router 706 is configured to divert to the transparent relay 710 all IP packets coming from or going to the well known SMTP port number 25 ("port 25"). This allows the transparent relay 710 to receive e-mails messages going to or coming from the e-mail client 701. As will be more apparent below, the transparent relay 710 operates as a transparent TCP (Transmission Control Protocol) relay rather than a full-blown MTA. That is, the transparent relay 710 operates transparently between the e-mail client 701 and the MTA 704. This transparent operation is advantageous because, in contrast to a proxy (which requires an explicit configuration on the client), the transparent relay 710 is not readily "visible" to other nodes and is thus less vulnerable to network attacks.

In the example of FIG. 9, the transparent relay 710 comprises a pair of communications interfaces 106 (i.e., 106A, 106B) for communicating over a computer network, an SMTP processor 712, and network security policies 713. In one embodiment, the communications interface 106A, also referred to as "client communications interface" or "downstream interface," is configured to send e-mail messages going to the e-mail client 701 and to receive e-mail messages coming from the e-mail client 701. The communications interface 106B, also referred to as "server communications interface" or "upstream interface," is configured to send e-mail messages going to the MTA 704 and to receive e-mail messages coming from the MTA 704. For example, SMTP traffic from the e-mail client 701 may be received by the router 706, which then diverts the SMTP traffic to the transparent relay 710 by way of the communications interface 106A for processing. Assuming the SMTP traffic from the e-mail client 701 does not violate any policy 713, the transparent relay 710 may then forward the SMTP traffic to the MTA 704 by way of the communications interface 106B. Similarly, SMTP traffic from the MTA 704 and destined to the e-mail client 701 may be received by the router 706, which then diverts that SMTP traffic to the transparent relay 710 by way of the communications interface 106B. Assuming the SMTP traffic from the MTA 704 does not violate any policy 713, the transparent relay 710 may then forward the SMTP traffic to the e-mail client 701 by way of the communications interface 106A. Running separate communications interfaces 106 for the client and server advantageously allows the SMTP processor 712 to readily determine the direction of a packet.

In other embodiments, the router 706, or other router, may divert SMTP traffic to and from the e-mail client 701 to the transparent relay 710 by way of logical tunnels using mechanisms like IPIP or GRE tunnels. The ability to divert traffic or tunnel is a common function available in commercially available IP routers.

When diverted IP packets are received in the transparent relay 710, they will still have their source and destination IP addresses untouched. Normally, the standard IP networking implementation (also referred to as "IP Stack") on a computer system would either attempt to route these packets or discard them, since the destination address is not it's own. To prevent this from happening, the transparent relay 710 may be configured such that it processes all network traffic as local. This mode of processing network traffic is also referred to as "promiscuous mode." In addition, the conventional IP stack would always want to send outgoing packets from one of its communications interfaces, rather than a particular communications interface. Running in promiscuous mode allows incoming packets to be processed in the transparent relay 710 and outgoing packets to be sent by way of a communications interface 106.

By running the communications interfaces 106 in promiscuous mode, the normal processing involved with TCP/IP communication is no longer available. The transparent relay 710 must therefore implement associated state machines for handling network traffic flowing in both directions (i.e., to and from the e-mail client 701). In one embodiment, the SMTP processor 712 includes state machines for handling network traffic in either direction. As will be more apparent below, the SMTP processor 712 may perform network security functions in the course of processing SMTP traffic. For example, the SMTP processor 712 may decompose network traffic and enforce the policies 713 on the traffic.

The SMTP processor 712 may comprise computer-readable program code configured to process e-mail-related network traffic between an e-mail client and an e-mail sever, to maintain a communication session between the e-mail client and the e-mail server, and to enforce network security-related polices on the e-mail-related traffic. In one embodiment, the SMTP processor 712 is configured to receive and process SMTP traffic between the e-mail client 701 and the MTA 704. In one embodiment, the policies 713 contain information on what type of e-mail actions are permitted in the network that includes the client 701, the router 706, and the transparent relay 710. The policies 713 may be set by a network administrator or updated by an SOC server (e.g., SOC server 260 of FIG. 1), for example.

As can be appreciated, although the operation of the transparent relay 710 is described herein in the context of a single e-mail client and a single e-mail server for clarity of illustration, the transparent relay 710 may be configured to process e-mail traffic from a plurality of e-mail clients and e-mail servers. For example, the router 706 (or other routers) may be configured to divert to the transparent relay 710 all SMTP traffic going to or originated by e-mail clients within a particular network. Furthermore, multiple transparent relays 710 may be employed depending on the size of the network.

Figure 10:
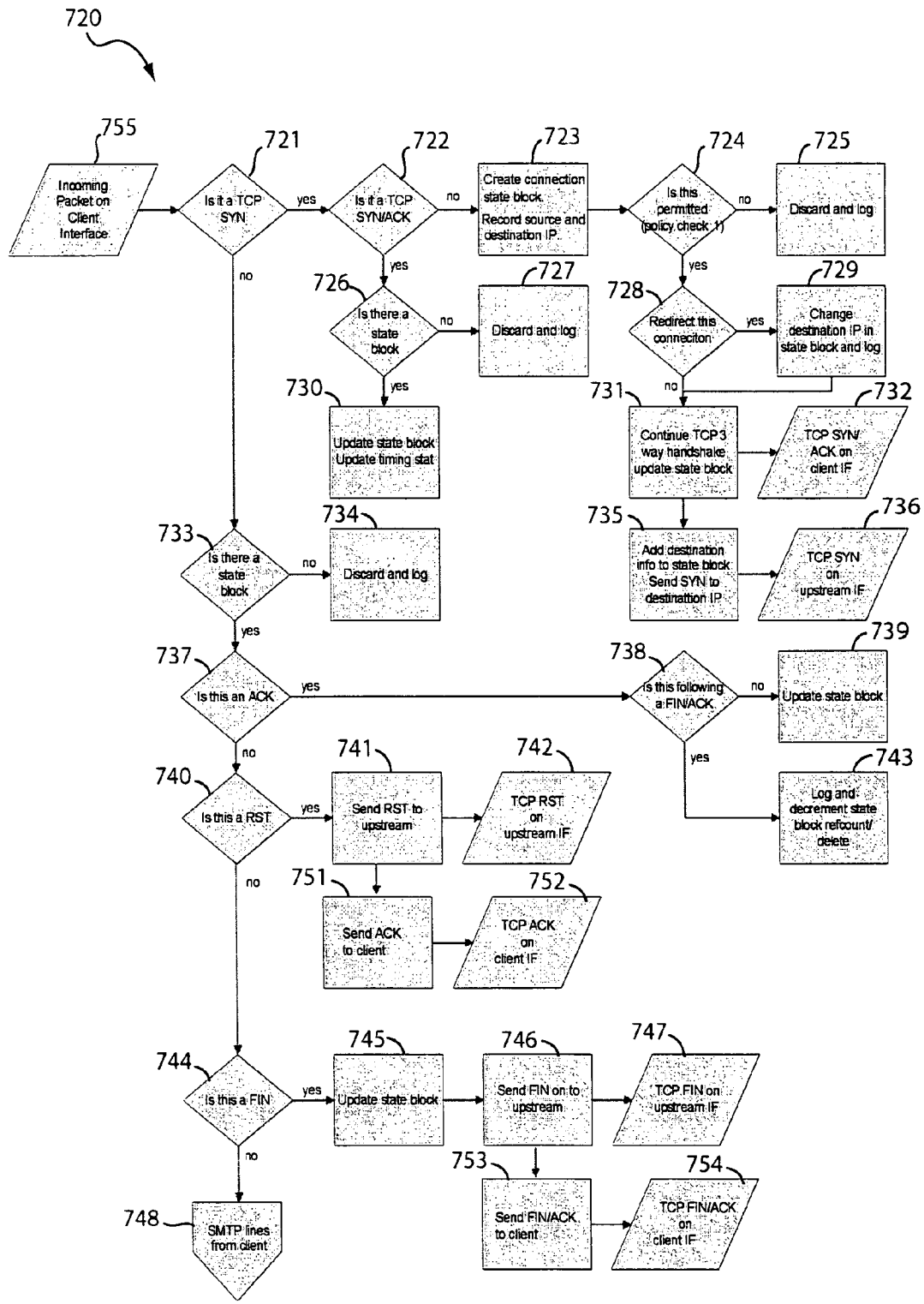
FIGS. 10, 11, and 12 show flow diagrams of a method of processing e-mail traffic originated by an e-mail client in accordance with an embodiment of the present invention.
Figure 11:
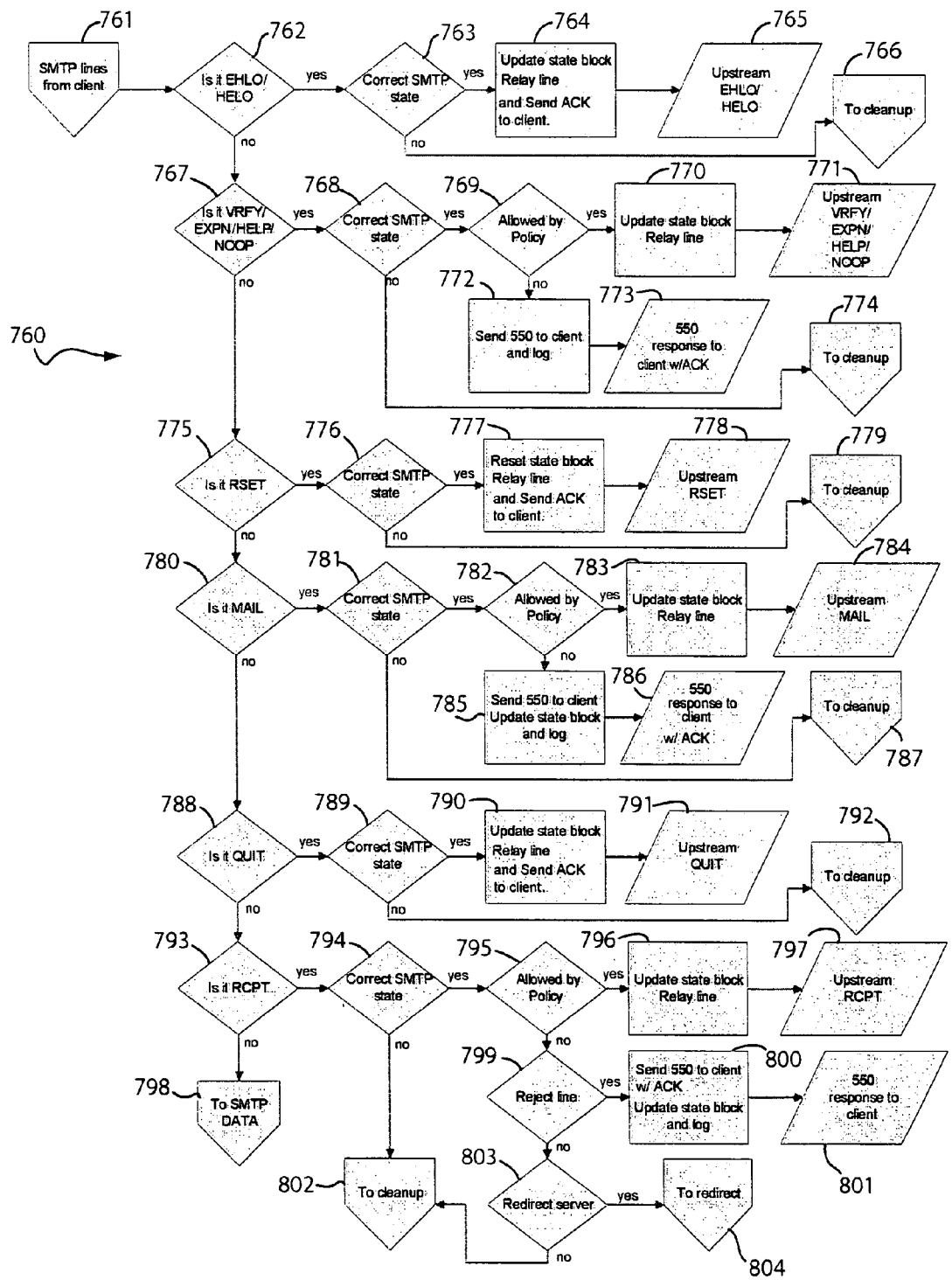
Figure 12:
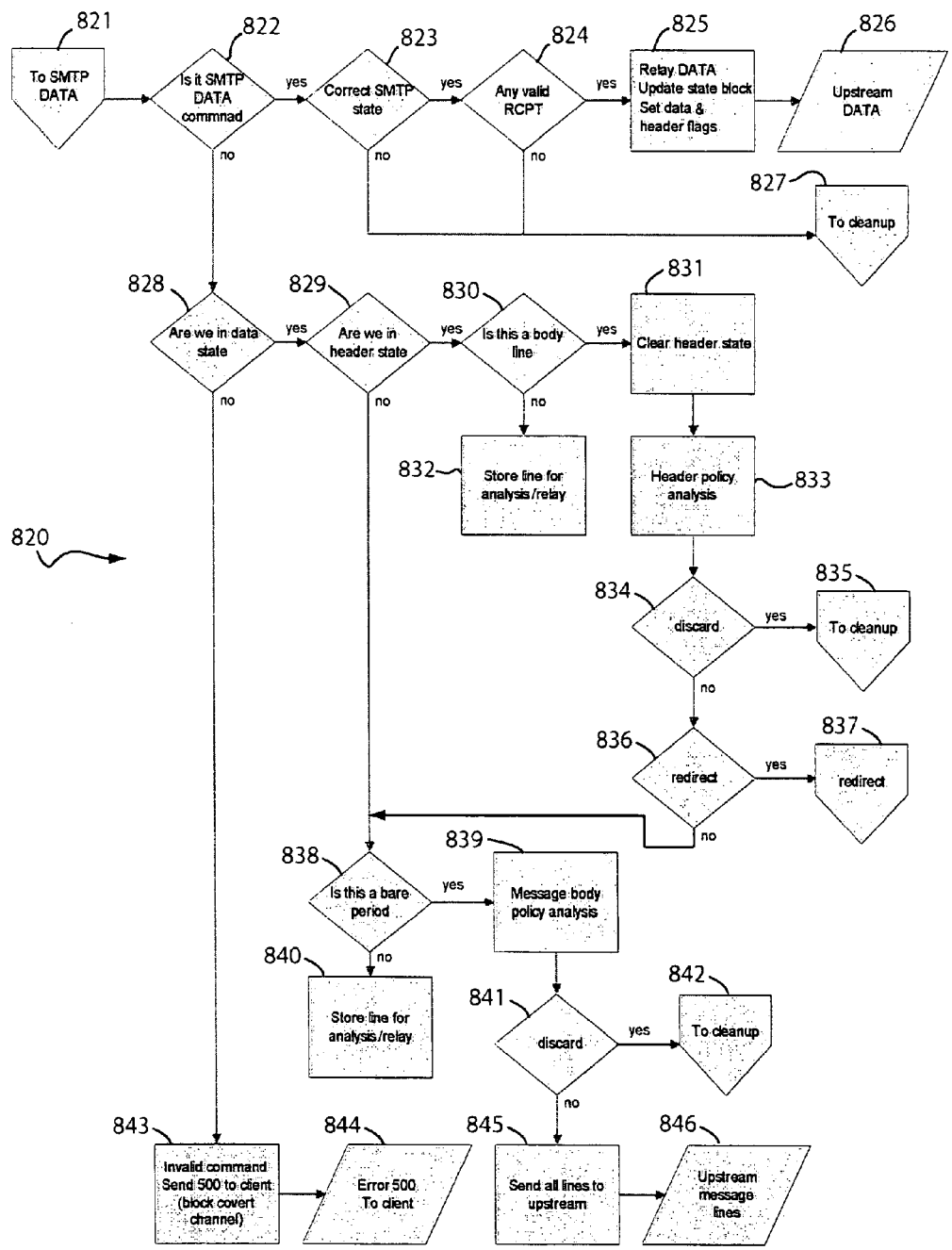

FIGS. 10, 11, and 12 show flow diagrams of a method of processing e-mail traffic originated by an e-mail client in accordance with an embodiment of the present invention. The method of FIGS. 10, 11, and 12 may be performed by the SMTP processor 712 to process SMTP traffic from the e-mail client 701, for example.

The flow diagram of FIG. 10, labeled as 720, is for processing packets transmitted by the e-mail client 701 to establish a connection to the MTA 704 during the so-called TCP 3-way handshake. The SMTP processor 712 receives incoming packets from the client 701 on the communications interface 106A (block 755). If the packet is a TCP SYN packet (i.e., has the SYN flag set), the packet is for establishing an IP connection and is analyzed by the SMTP processor 712 for network security threats that involve establishing a connection (block 721 to block 722). If the packet is not a TCP SYN/ACK (i.e., not a packet with both the SYN and ACK flags in the IP header set), the packet is for a new connection. In that case, the SMTP processor 712 creates a connection state block for the connection and records the source and destination IP address for that connection (block 723). A connection state block is a data structure that holds all the relevant information about a single connection. Such connection information may include the TCP state of the client and server TCP state machines, the SMTP state machines, and time information as to when information was sent each direction. It also records all information sent by the client, so that the transparent relay 710 can choose to redirect the SMTP transaction at any time.

The SMTP processor 712 checks the policies 713 if the e-mail client 701 is allowed to initiate a new connection (block 724). If not, the SMTP processor discards the packet and logs the event (block 725). This advantageously prevents possible malicious codes from initiating new connections to contact an external server to "phone home," to send e-mail messages when it is not authorized to do so, or to send spam, for example.

If the policies 713 indicate that the e-mail client is not prohibited from sending a TCP SYN packet (block 724 to block 728), the SMTP processor 712 checks the policies 713 to determine if such a connection is to be redirected (block 728). In that case, the SMTP processor 712 changes the destination IP of the packet to that of another computer where the packet is to be redirected, updates the state block of the connection, and logs the event (block 729). Redirection may be advantageous in situations where investigation of possible malicious code infection is better made by another computer offline (rather than in real-time by the transparent relay 710), for example.

If the connection is not to be redirected (block 728 to block 731), the SMTP processor 712 enables the TCP 3-way handshake to continue (block 731). Accordingly, the SMTP processor 712 sends a TCP SYN/ACK packet to the e-mail client 701 (block 732), adds the destination information to the state block (block 735), and sends a TCP SYN packet to the destination IP address, which is that of the MTA 704 in this example (block 736).

If the packet is a TCP SYN/ACK packet (block 722 to block 726), the packet is for an existing connection. In that case, the SMTP processor 712 checks if there is an existing connection state block for the connection (block 726). If so, the SMTP processor 712 updates that connection state block and timing status four the connection (block 726 to block 730). If there is no existing connection state block for the connection (block 726 to block 727), the SMTP processor 712 assumes that the connection is unauthorized (e.g., from malicious code) and accordingly discards the packet and logs the event (block 727).

If the packet received from the e-mail client 701 does not have the SYN flag set (block 721 to block 733), the packet is for an existing connection. In that case, the SMTP processor 712 checks if there is an existing connection state block for the connection (block 733). The SMTP processor 712 assumes that the connection is unauthorized if there is no existing connection state block for the connection. In that case the SMTP processor 712 discards the packet and logs the event (block 734). If there is an existing state block for the connection (block 733 to block 737), the SMTP processor 712 proceeds to process the packet depending on its other IP header flags as follows:

ACK flag set (block 737). If following a TCP FIN/ACK packet (i.e., with the FIN and ACK flags set), the SMTP processor 712 logs the event and decrements the connection state block reference count or delete the reference count if it is zero after decrement (block 738 to block 743). Otherwise, the SMTP processor 712 just updates the connection state block (block 738 to block 739).

RST flag set (block 740). The SMTP processor 712 sends a TCP RST packet to the MTA 704 (block 741 to block 742) and a TCP ACK packet to the client 701 (block 751 to block 752).

FIN flag set (block 744). The SMTP processor 712 updates the connection state block (block 745), sends a TCP FIN packet to the MTA 704 (block 746 to block 747), and sends a FIN/ACK packet to the client 701 (block 753 to block 754).

If the packet from the client e-mail 701 is not for initiating a new connection (block 721), not an acknowledgement (block 737), not a restart (block 740), not a finish indicator (block 744), and has a corresponding connection state block, the packet is either for an SMTP DATA command or other SMTP commands. The processing of SMTP command packets other than the SMTP DATA command is discussed with reference to the flow diagram of FIG. 11, while the processing of SMTP DATA command packets is discussed with reference to the flow diagram of FIG. 12. From block 748 of FIG. 10, processing of the packet received from the e-mail client 701 continues to block 761 of FIG. 11.

The flow diagram of FIG. 11, labeled as 760, is for processing packets originated by the e-mail client 701 to send SMTP commands other than the SMTP data command. In the flow diagram of FIG. 11, the SMTP processor 712 processes the packet received from the e-mail client 701 depending on the command. For any of the following SMTP commands, the SMTP processor 712 performs a cleanup (see FIG. 15) if the connection state block indicates that the current SMTP state is not correct for the command (block 763 to block 766 for the EHLO/HELO command; block 768 to block 774 for the VRFY/EXPN/HELP/NOOP commands; block 776 to block 779 for the RSET command; block 781 to block 787 for the MAIL command; block 789 to block 792 for the QUIT command; and block 794 to 802 for the RCPT command). The SMTP processor 712 processes the e-mail client packet depending on the particular SMTP command indicated by the packet.

EHLO/HELO command (block 762). The connection state block is updated and the command is forwarded to the MTA 704 (blocks 764 and 765). A TCP ACK packet is also sent to the client 701 (block 764).

VRFY/EXPN/HELP/NOOP command (block 767). The SMTP processor 712 checks the policies 713 if the e-mail client 701 is authorized to issue these SMTP commands (block 769). For example, a policy 713 may dictate limitations on VRFY and EXPN commands to prevent "mining" of valid e-mail addresses. If the e-mail client 701 is not authorized by policy to issue the aforementioned commands (block 769 to block 772), the SMTP processor 712 sends an error message 550 to the e-mail client 701 with the TCP ACK flag set and logs the event (block 772 to block 773). Otherwise (block 769 to block 770), the SMTP processor 712 updates the connection state block and forwards the command to the MTA 704 (block 770 to block 771).

RSET command (block 775). The connection SMTP state is reset and the command is forwarded to the MTA 704 (block 777 to block 778). A TCP ACK packet is also sent to the client 701 (block 777).

MAIL command (block 780). The SMTP processor 712 checks the policies 713 if the e-mail client 701 is authorized to issue a MAIL command (block 782). If not (block 782 to block 785), the SMTP processor 712 sends an error message 550 to the e-mail client 701 with the ACK flag set, updates the connection state block, and logs the event (block 785 to block 786). Otherwise (block 782 to block 783), the SMTP processor 712 updates the connection state block and forwards the command to the MTA 704 (block 783 to block 784).

QUIT command (block 788). The connection state block is updated and the QUIT command is forwarded to the MTA 704 (block 790 to block 791). A TCP ACK packet is also sent to the client 701 (block 790).

RCPT command (block 793). The SMTP processor 712 checks the policies 713 if the e-mail client 701 is authorized to issue a RCPT command (block 795). For example, the policies 713 may dictate a limitation on RCPT lists or RCPT lists that include a large number of rejected addresses. If so (block 795 to block 796), the SMTP processor 712 updates the connection state block and forwards the RCPT command to the MTA 704 (blocks 796 and 797). If not (block 795 to block 799), the SMTP processor 712 checks the policies 713 whether to outright reject the packet (block 799 to block 800), redirect the packet to another computer (block 799 to block 803 to block 804) for investigation or other purpose, or, else, perform a cleanup (block 803 to block 802). If the packet is to be rejected, the SMTP processor 712 sends an error message 550 to the e-mail client 701 with the TCP ACK flag set, updates the connection state block, and logs the event (block 800 to block 801). If the packet is to be redirected to another computer, the processing of the packet continues from block 804 to block 931 (see FIG. 16) to redirect the packet. Otherwise, the SMTP processor 712 performs a cleanup (block 802).

From block 798 of FIG. 11, processing of the packet received from the e-mail client 701 continues to block 821 of FIG. 12.

The flow diagram of FIG. 12, labeled as 820, is for processing packets originated by the e-mail client 701 to send the SMTP DATA command. The flow diagram of FIG. 12 is reached when the packet is neither for initiating a connection nor for sending an SMTP command other than the SMTP DATA command. At this point, the SMTP processor 712 checks the packet if it contains an SMTP DATA command (block 822). If it does (block 822 to block 823), the SMTP DATA command is valid for the current SMTP state, and a valid SMTP RCPT command has been received (block 823 to block 824), the SMTP processor 712 forwards the DATA command to the MTA 704, updates the connection state block, and sets the data and header flags in the state block (blocks 825 and 826). Otherwise (block 823 or block 824 to block 827), the SMTP processor 712 performs a cleanup (block 827).

If the packet is not for an SMTP DATA command (block 822 to block 828), the SMTP processor 712 checks if the current SMTP state is the data state (block 828). If not, the SMTP processor 712 deems the packet to be containing an invalid SMTP command and sends an error message 500 to the client 701 (block 843 to block 844). This advantageously blocks covert channels. If the current SMTP state is the data state (block 828 to block 829) but not the header state (block 829 to block 838) but not a bare period (block 838 to block 840), the SMTP processor 712 stores the packet for later analysis and forwarding to another computer, for example. If it is currently a bare period (block 838 to block 839), the SMTP processor 712 analyzes the body of the e-mail message for policy analysis (block 839). For example, a policy 713 may prohibit links to certain websites. The e-mail message may be discarded and a cleanup may be performed (block 841 to block 842) if the packet contains an e-mail message body that violates a policy 713 (e.g., link to a phishing site). The packet may be forwarded to the MTA 704 if the message body does not violate a policy 713 (block 845 to block 846).

If the current SMTP state is the header state (block 829 to block 830) and the packet does not contain a body line (block 830 to block 832), the packet is stored for later analysis and possible forwarding. The SMTP header state is cleared if the packet contains a body line (block 830 to block 831). In that case, the SMTP processor 712 analyzes the header of the e-mail (block 833) contained in the packet to determine if the policies 713 require the packet to be discarded (block 834 to block 835) or redirected to another computer (block 836 to block 837). For example, a policy 713 may dictate that certain header values (e.g., bulk flags, mismatches between recipients and header to/cc lines) are indicative of spam. If a header is indicative of spam, the policy 713 may dictate discarding (block 835) or redirection (block 837) of the packet.

Figure 13:
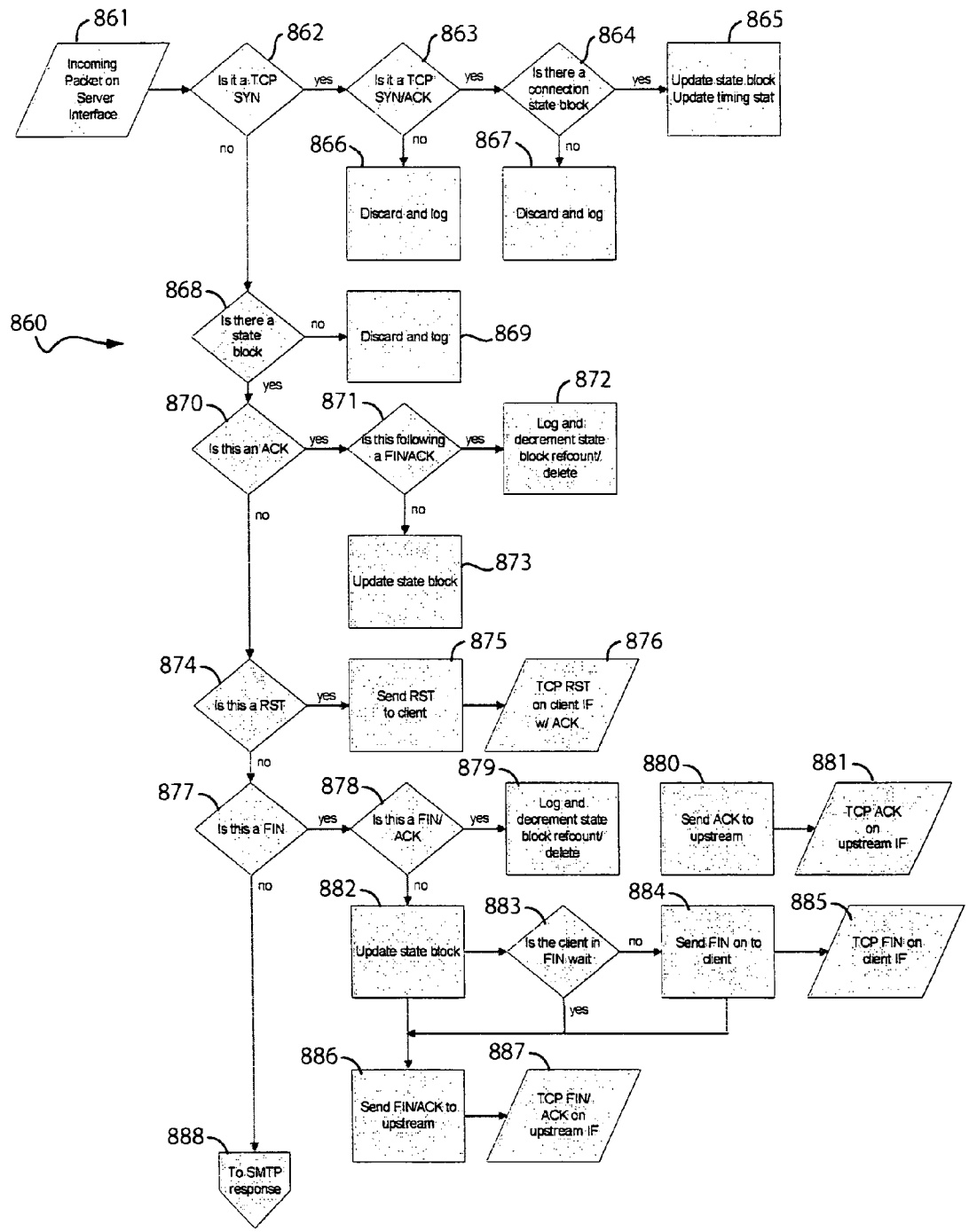
FIGS. 13 and 14 show flow diagrams of a method of processing e-mail traffic originated by an e-mail server in accordance with an embodiment of the present invention.
Figure 14:
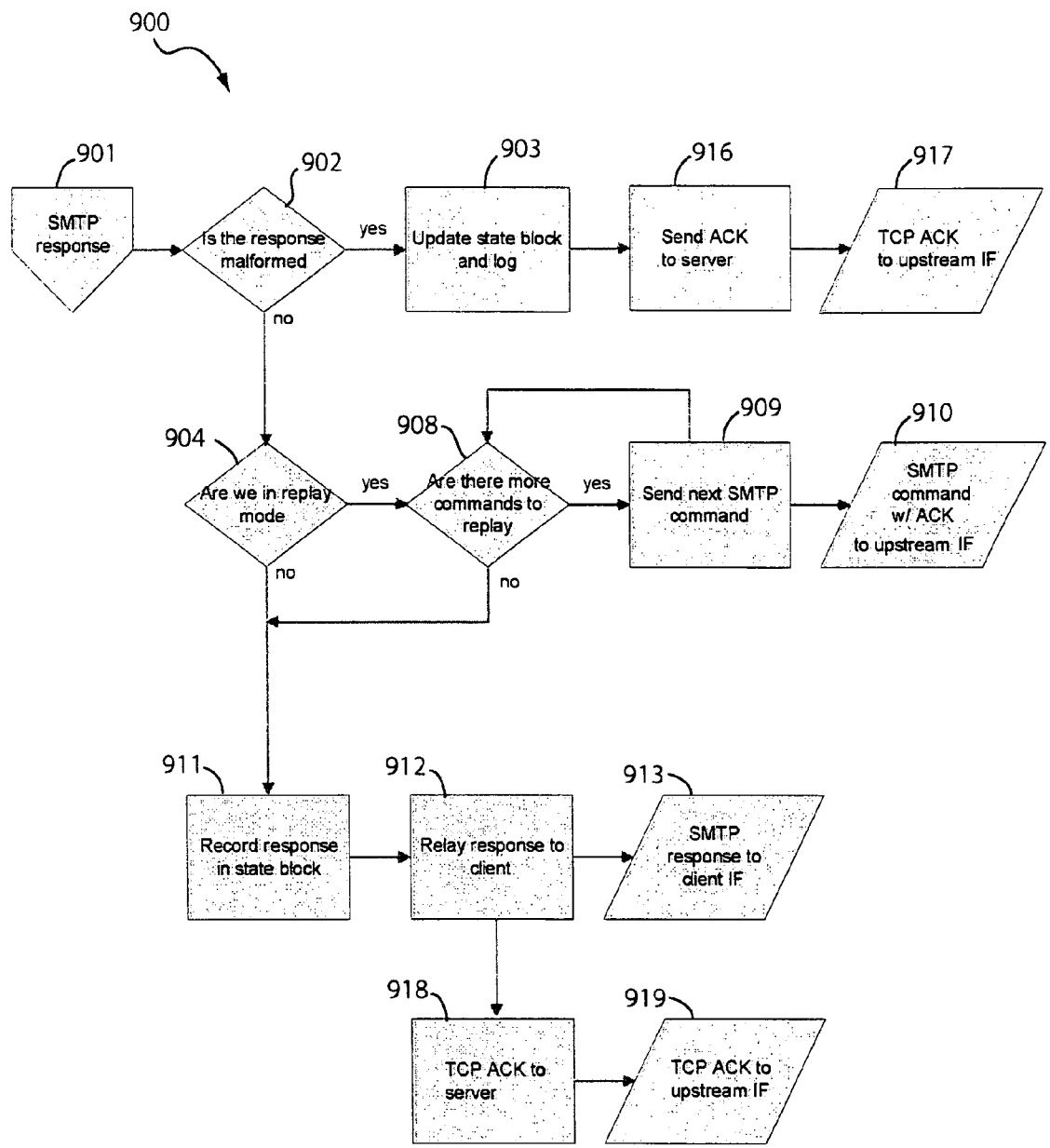

FIGS. 13 and 14 show flow diagrams of a method of processing e-mail traffic originated by an e-mail server in accordance with an embodiment of the present invention. The method of FIGS. 13 and 14 may be performed by the SMTP processor 712 to process SMTP traffic from the MTA 704, for example.

The flow diagram of FIG. 13, labeled as 860, is for processing packets transmitted by the MTA 704 to establish a connection to the e-mail client 701 during a TCP 3-way handshake. The SMTP processor 712 receives incoming packets from the MTA 704 on the communications interface 106B (block 861). If the packet is a TCP SYN packet, the packet is for establishing an IP connection. In that case, the SMTP processor 712 checks if the packet is a TCP SYN/ACK packet (block 862 to block 863). If the packet is not a TCP SYN/ACK, the SMTP processor 712 discards the packet and logs the event (block 866). Otherwise (block 863 to block 864), the packet is presumably for a connection initiated by the e-mail client 701 and should therefore have a corresponding, previously created connection state block. The SMTP processor 712 discards the packet and logs the event if there is no existing state block (block 867). The SMTP processor 712 updates the state block and timing status if there is an existing state block (block 865).

If the packet received from the MTA 704 does not have the SYN flag set (block 862 to block 868), the packet is for an established connection. In that case, the SMTP processor 712 checks if there is an existing connection state block for the connection (block 868). The SMTP processor 712 assumes that the connection is unauthorized if there is no existing connection state block for the connection, and accordingly discards the packet and logs the event (block 869). If there is an existing state block for the connection (block 868 to block 870), the SMTP processor 712 proceeds to process the packet depending on its other IP header flags as follows:

ACK flag set (block 870). If following a TCP FIN/ACK packet (i.e., with the FIN and ACK flags set), the SMTP processor 712 logs the event and decrements the connection state block reference count or delete the reference count if it is zero (block 871 to block 872). Otherwise, the SMTP processor 712 just updates the connection state block (block 871 to block 873).

RST flag set (block 874). The SMTP processor 712 sends a TCP RST packet with the ACK flag set to the e-mail client 701 (block 875 to block 876).

FIN flag set (block 877). If the packet is a FIN/ACK packet (block 878 to block 879), the SMTP processor 712 logs the event, decrements the connection state block reference count or delete the reference count if it is zero after decrement (block 879), and sends a TCP ACK packet to the MTA 704 (block 880 and block 881). If the packet is not a FIN/ACK packet (block 878 to block 882), the SMTP processor 712 updates the state block (block 882), sends a FIN/ACK packet to the MTS 704 (block 886 to block 887), and checks if the e-mail client 701 is in the FIN wait state (block 883). The SMTP processor 712 sends a TCP FIN packet to the e-mail client 701 (block 884 to block 885) if the e-mail client 701 is not in the FIN wait state.

If the packet from the MTA 704 is not for establishing a new connection (block 862), not an acknowledgement (block 870), not a restart (block 874), not a finish indicator (block 877) and has a corresponding connection state block, the packet is assumed to be an SMTP response packet (block 888). The processing of SMTP response packets from the MTA 704 is discussed with reference to the flow diagram of FIG. 14. From block 888 of FIG. 13, processing of the packet received from the MTA 704 continues to block 901 of FIG. 14.

The flow diagram of FIG. 14, labeled as 900, is for processing packets transmitted by the MTA 704 to respond to SMTP packets sent by the e-mail client 701. Block 901 of FIG. 14 follows from block 888 of FIG. 13. The SMTP processor 712 checks the SMTP response packet for proper format (block 902). The SMTP processor 712 updates the state block and logs the event if the response packet is malformed (block 903) to block covert channels, for example. The SMTP processor 712 then sends a TCP ACK packet to the MTA 704 (block 916 to block 917). Otherwise, the SMTP processor 712 checks to see if it is in replay mode (block 904). If the SMTP processor 712 is in replay mode, it looks for more commands from the e-mail client 701 to replay (e.g., after a redirect) to the MTA 704 (block 908). If there are more commands to replay, the SMTP processor 712 sends the next SMTP command by way of the communications interface 106B (block 909 to block 910).

If the SMTP processor 712 is not in replay mode (block 904 to block 911), the SMTP processor 712 records the response in the state block (block 911), relays the SMTP response packet to the e-mail client 701 (block 912 to block 913) on the communications interface 106A, and sends a TCP ACK packet to the MTA 704 by way of the communications interface 106B (block 918 and block 919).

Figure 15:
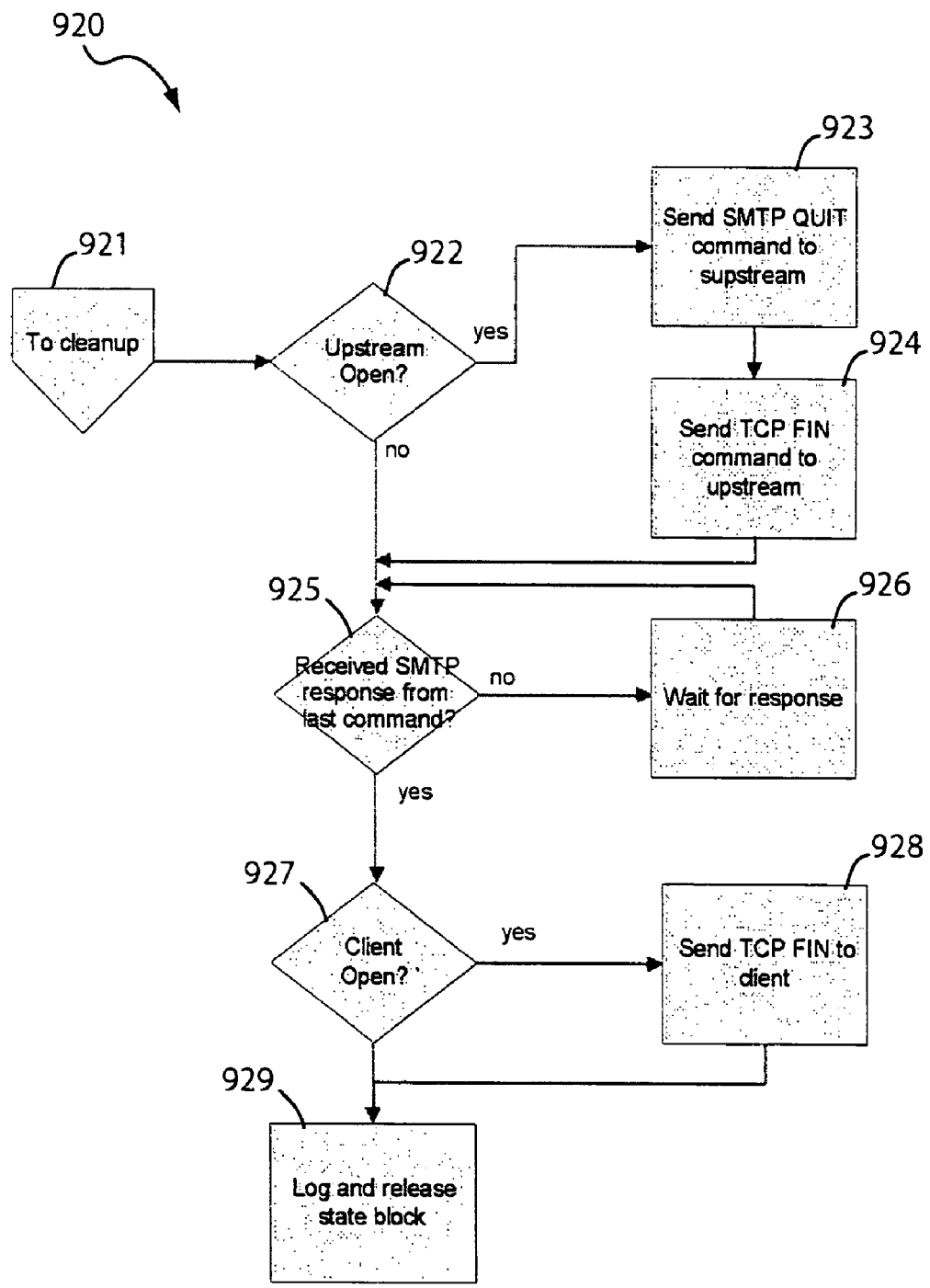
FIG. 15 shows a flow diagram illustrating a connection cleanup process in accordance with an embodiment of the present invention.

The flow diagram of FIG. 15, labeled as 920, is for performing a connection cleanup in accordance with an embodiment of the present invention. In the example of FIG. 15, the SMTP processor 712 checks if the upstream connection to the MTA 704 is open (block 921 to block 922). If so, the STMP processor 712 sends an SMTP QUIT command (block 923) and a TCP FIN packet (block 924) to the MTA 704 (block 924). If the upstream connection to the MTA 704 is not open, the SMTP processor 712 waits for an STMP response in the case where it has not received the SMTP response from the last SMTP command sent to the MTA 704 (block 925 to 926). If the connection to the client is open, the SMTP processor 712 sends a TCP FIN packet to the client (block 927 to block 928) before logging the event and releasing the connection state block (block 929).

Figure 16:
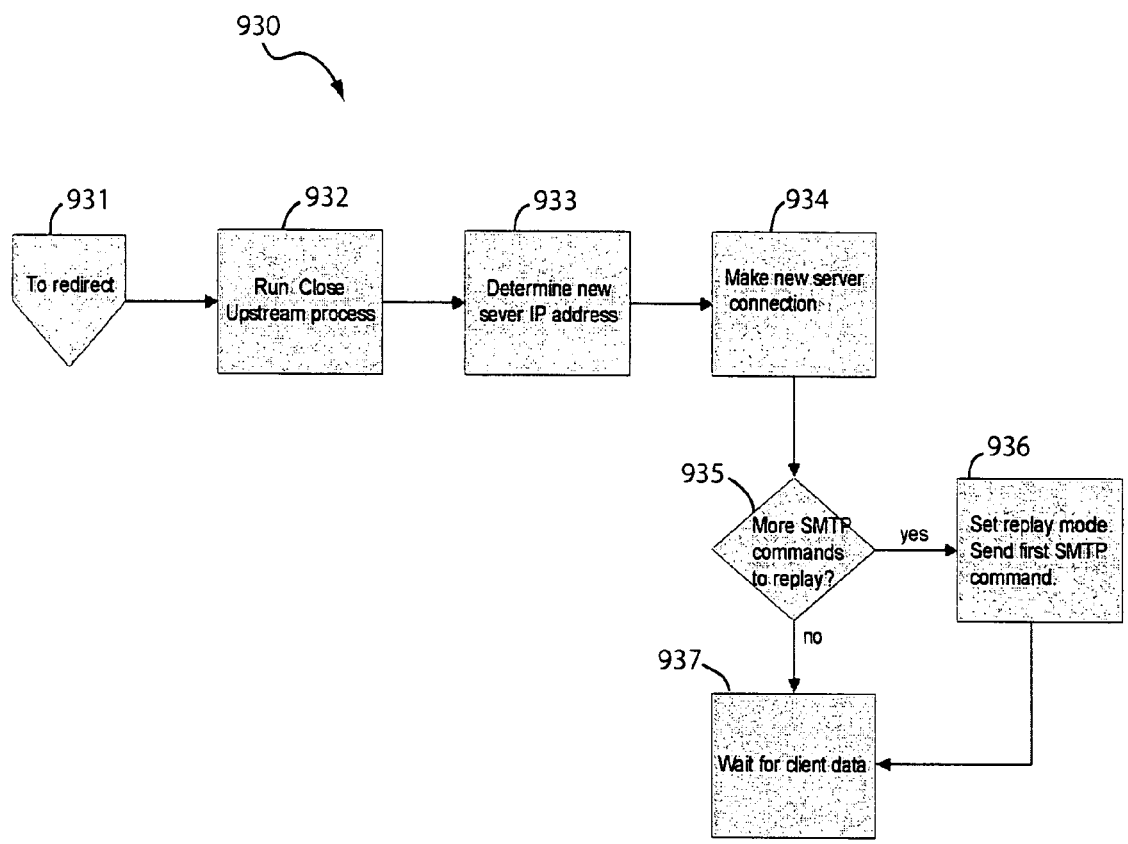
FIG. 16 shows a flow diagram illustrating a redirection process in accordance with an embodiment of the present invention.

The flow diagram of FIG. 16, labeled as 930, is for performing a redirection in accordance with an embodiment of the present invention. The SMTP processor 712 closes the upstream process to the MTA 704 (block 931 to block 932) and determines the new server IP address to redirect the packet (block 933). The SMTP processor 712 then makes a connection to the server where packets are to be redirected (block 934). The SMTP processor 712 checks if there are SMTP commands to replay (block 935). The SMTP processor 712 sends out the first command (further commands are sent in blocks 908 and 909 of FIG. 14) (block 936). If there no more commands to send, the SMTP processor 712 waits for data from the e-mail client 701 (block 937).

The flow diagrams of FIGS. 10-16 illustrate how the transparent relay 710 may relay SMTP communications between the e-mail client 701 and the e-mail MTA 704. This allows the transparent relay 710 to be inserted between the e-mail client 701 and the MTA 704, enabling analysis of e-mail messages passing through it. That is, rather than just performing a relay function, the transparent relay 710 stores as well as forwards messages. Stored messages may be analyzed by the SMTP processor 712 to identify and combat threats.

The SMTP processor 712 may process and analyze each command and response before the SMTP transfer can progress to the next state. An important piece of information about SMTP is that there is a separate "envelope" containing mail routing information that is only seen by the next MTA, and the "message" that is what the end user sees. The message is further broken into headers (see RFC 822 and descendants) and the body. The body is ASCII text, and may have many forms of internal encoding such as MIME (see RFC 2045). Policy checks may be made for individual message line before it is forwarded to the original target machine. Responses from the server back to the client as well as the commands from the client to the server may be analyzed for conformance to policies.

The policy actions to be performed by the transparent relay 710 for each message may be to permit the message, discard the message, return an error to the client, modify the message on the fly or to redirect the message to a different email server. An interesting case of the redirect is to send the mail to a "honeypot" system for later detailed analysis.

The permit policy action simply allows the transparent relay 710 to act as a transparent relay all the way through the connection. The permit policy action is for the case when the SMTP processor 712 does not identify the message as a threat. To discard a message in the discard policy action (e.g., blocks 725, 727, and 734 in FIG. 10), the SMTP and TCP states may be unwound and completed. The error policy action (e.g., block 769 to block 772 in FIG. 11) sends the indicated error back to the client and waits for the next client message.

There are two example cases involving the modification of an e-mail. If the envelope is to be modified, this may or may not require modifying messages already sent through to the server system. In this case, the transparent relay 710 may use the SMTP RSET command and replay the previous messages to the server with the needed changes. The client is totally unaware of these changes. If the modification is made to the body, this can be done if the text has not been sent on to the server. For this reason, a buffer may be kept with the first part of the message; the contents of the buffer may not be analyzed and sent until it is full or the client has signaled the end of message.

The redirect policy action, which is illustrated in FIG. 16, uses some functions from the drop policy action and some from the modify policy action. When a redirect policy action is detected, the transparent relay 710 may first unwind the server connection, create the connection to the new server, and then replay the messages to get to the current SMTP state.

An important final function of the SMTP processing performed by the transparent relay 710 is to suppress the use of SMTP commands as a covert channel. Because anything can be sent as an SMTP command up to the line limit, and an error can have arbitrary text after the error code, an opportune channel for secreting data arises. By having cooperating systems on two ends, scanning the message for the secret data will not uncover the secret channel. Advantageously, the transparent relay 710 returns local errors, thus breaking a covert channel.

E-Mail Message Processing

Analyzing an e-mail message may be done in two parts. First, the headers may be analyzed for anomalies and known covert channels. Next the body may be counted for length and checksummed. The first and last n bytes of the body may be skipped in the checksum computation to avoid simple checksum poisoning. Determining the length and checksum of the body is useful in detecting repeated messages. These repeated messages may be SPAM or may be a legitimate user running a mailing list, which is something for the security operations team to research. It is also possible to include traditional content scanning and reputation functions at this point. This is still lower overhead compared to a full store and forward MTA implementation.

Single E-Mail Message Behavior Detection

The first level of detection happens within a single message. There are a number of policy checks that may be performed on a single message including:

At the point a client system connects. Is this client allowed to send e-mails (e.g., block 724 to block 725 of FIG. 10)? Is this client on a known spam "blacklist"? If so, it may be appropriate to reroute the email to a spam collector (e.g., block 724 to block 728 to block 729 of FIG. 10).

Once the session is allowed to start. Is this client sending emails with long RCPT lists (e.g., block 795 to block 799 of FIG. 11)? Is the recipient system rejecting a large percentage of the RCPT list (e.g., block 795 to block 799 of FIG. 11)? Is the client sending VFRY or EXPN commands to try to "mine" possible email recipients (e.g., block 769 to block 772 of FIG. 11)? Is the client sending invalid commands or unusual text following a valid command (e.g., block 843 of FIG. 12)? Is the recipient system sending back unusual response messages (e.g., block 902 to block 903 of FIG. 14)?

Once the SMTP DATA transmission occurs. Are there headers indicative of spam (e.g., block 833 of FIG. 12)? Does the body contain URLs that are known to be dangerous (e.g., block 839)?

Aggregate E-Mail Messages Analysis

There are several levels of aggregate measurement analysis that may be performed on multiple messages. Aggregate analysis may be performed based on logged events, behavior observed by the transparent relay 710, or behavior observed by another server to which packets are redirected.

The first is to look at the set of messages originating or terminating at a single IP address. It would be unusual to have a system either emit or receive a burst of messages at a nearly fixed interval. This could either be indicative of a covert timing channel or a centralized control system. A rolling logarithmic activity record may be kept for each IP address, with local analysis tools for detecting repetitions.

There are also spam detection checks at the single machine level. When sending spam, often large parts of the body will be identical. Care must be taken to not falsely identify mailing lists. For example, the STMP processor 712 may take into account the rate or interval a particular machine is sending e-mail messages.

The second is to look at message body lengths and checksums. The correlation of messages from a single machine was mentioned above. The correlation of messages between different machines may provide more information. The transparent relay 710 may have a list of known MTA relay systems to exclude, since it is very common for the same message to come in and out of the MTA in a correlated way. Once those MTA relay systems are removed, the event would be a clear indicator of a set of machines acting in similar ways, which would be investigated as a possible bot attack. It is highly unlikely that unrelated machines would send emails with the same body checksum.

The third area to look at is the relation between message traffic seen on the transparent relay 710 and DNS traffic seen and collected on DNS appliances 210 (see FIG. 2). It is standard for a machine to issue a DNS query for MX records before making an SMTP connection. There are a number of aspects of the relationship to look at. Firstly, messages coming from e-mail clients who do not show DNS MX activity are highly suspicious. This would indicate machines that are not using DNS servers and need to be investigated. Secondly, servers or clients that have been in the DNS trigger address spaces or have been put in quarantine via DNS should be blocked by the transparent relay 710 as well. Thirdly, if anomalous activity by a machine is detected on the transparent relay 710, that machine should be reported to the DNS appliances 210.

HTTP Transparent Relay

Accessing the World Wide Web from browsers using the Hyper Text Transfer Protocol (HTTP) (RFC 2616) is currently the most common activity on the Internet. It is also one of the largest security risks on the Internet. The web browser is the most common vehicle for modern computer infections, and is the most common form of publicly available covert channel software.

Most browser requests for web pages commonly use the HTTP protocol. An HTTP transparent relay is similar in many ways to the previously discussed SMTP transparent relay 710. The ways of connecting a HTTP transparent relay into a path between a web browser and a web server are similar to those discussed in connection with SMTP processing. For the HTTP transparent relay, it is useful to include a web caching module that can locally satisfy responses that it has previously seen.

Figure 17:
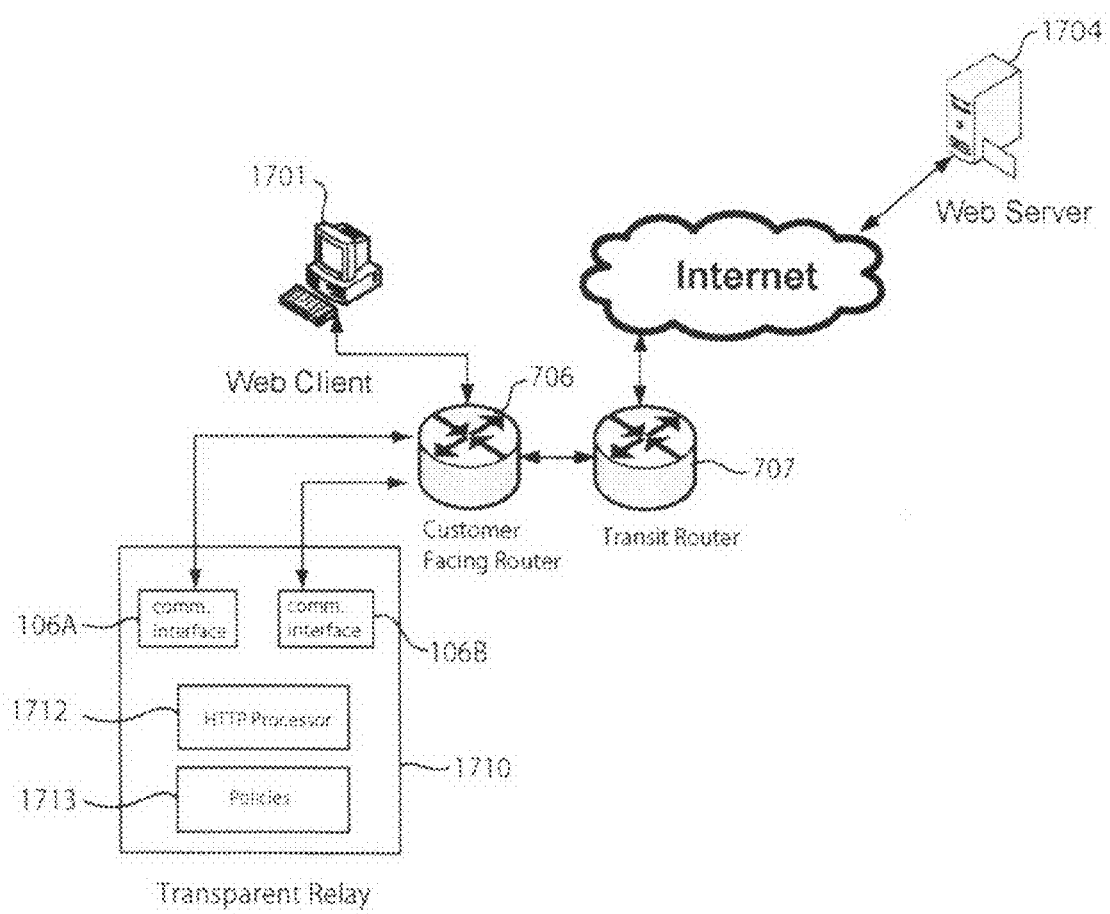
FIG. 17 schematically shows an HTTP processing system in accordance with an embodiment of the present invention.

FIG. 17 schematically shows an HTTP processing system in accordance with an embodiment of the present invention. In the network of FIG. 17, an HTTP transparent relay 1710 is employed to process HTTP packets for network security analysis and control.

In the example of FIG. 17, the web client 1701 and the web server 1704 communicate over the Internet, with their network traffic being routed by a transit router 707, the customer facing router 706, and other network routers and nodes not specifically shown. The customer facing router 706 may be part of the same private computer network as the web client 1701. In the example of FIG. 9, the router 706 is configured to divert to the HTTP transparent relay 1710 all packets passing through the router 706 and destined to or coming from a designated port number of a software process for HTTP processing. In one embodiment, the router 706 is configured to divert to the HTTP transparent relay 1710 all IP packets coming from or going to the well known Internet port number 80 ("port 80"). This allows the HTTP transparent relay 1710 to receive HTTP packets going to or coming from the web client 1701.

The HTTP transparent relay 1710 may comprise a pair of communications interfaces 106 (i.e., 106A, 106B) for communicating over a computer network, an HTTP network security processor 1712, and network security policies 1713.

The communications interfaces 106 are preferably run in promiscuous mode. In one embodiment, the communications interface 106A is configured to send and receive HTTP packets going to or coming from the web client 1701. The communications interface 106B may be configured to send HTTP packets coming from the web client 1701 and to receive HTTP packets coming from the web client 1701. For example, HTTP traffic from the web client 1701 may be received by the router 706, which then diverts the HTTP traffic to the HTTP transparent relay 1710 by way of the communications interface 106A for processing. Assuming the HTTP traffic from the web client 1701 does not violate any policy 1713, the HTTP transparent relay 1710 may then forward the HTTP traffic to the web server 1704 by way of the communications interface 106B. Similarly, HTTP traffic from the web server 1704 and destined to the web client 1701 may be received by the router 706, which then diverts that HTTP traffic to the HTTP transparent relay 1710 by way of the communications interface 106B. Assuming the HTTP traffic from the web server 1704 does not violate any policy 1713, the HTTP transparent relay 1710 may then forward the HTTP traffic to the web client 1701 by way of the communications interface 106A.

The HTTP processor 1712 may comprise computer-readable program code configured to process web-related network traffic between a web client and web server, to maintain a communication session between the web client and the web server, and to enforce network security-related polices on the web-related traffic. In one embodiment, the HTTP processor 1712 is configured to receive and process HTTP traffic between the web client 1701 and the web server 704. In one embodiment, the policies 1713 contain information on what type of HTTP activities are permitted in the network that includes the web client 1701, the router 706, and the transparent relay 710. The policies 1713 may be set by a network administrator or updated by an SOC server (e.g., SOC server 260 of FIG. 1), for example. The HTTP transparent relay 1710 may process HTTP traffic from a plurality of web clients and servers but only one of each is shown in FIG. 17 for clarity of illustration.

HTTP Processing

The details of HTTP, in general, are well known and accordingly not repeated here. HTTP is described in various publicly available documents including several RFCs (e.g., RFC 2616, etc.). There are a number of publicly available software implementations for HTTP processing.

In HTTP 1.0, the protocol was a single request and response per TCP connection. HTTP 1.1 extended this to allowing multiple request/response pairs over a single TCP session, but the protocol state is reset between each one. HTTP removes the need for a complex command state machine, with each request being a single command/response pair. In version 1.0, each command/response pair is a separate TCP connection. Version 1.1 allows multiple command/response pairs to sequentially use the same TCP connections. Instead of the external commands that are different from the message in SMTP, the commands (called methods in the RFCs) are the first component of each request.

HTTP processing is somewhat different from SMTP processing. Since HTTP does not involve multiple protocol states, the ability to reconnect to another server is not needed. Instead, upstream connection is delayed until the request is processed, then the upstream node is selected. If there is an existing TCP connection for upstream traffic, the request is sent on that connection. If a new connection is needed, it is made at this time. All connections that originated from a single client TCP connection are torn down when the client connection closes.

Figure 18:
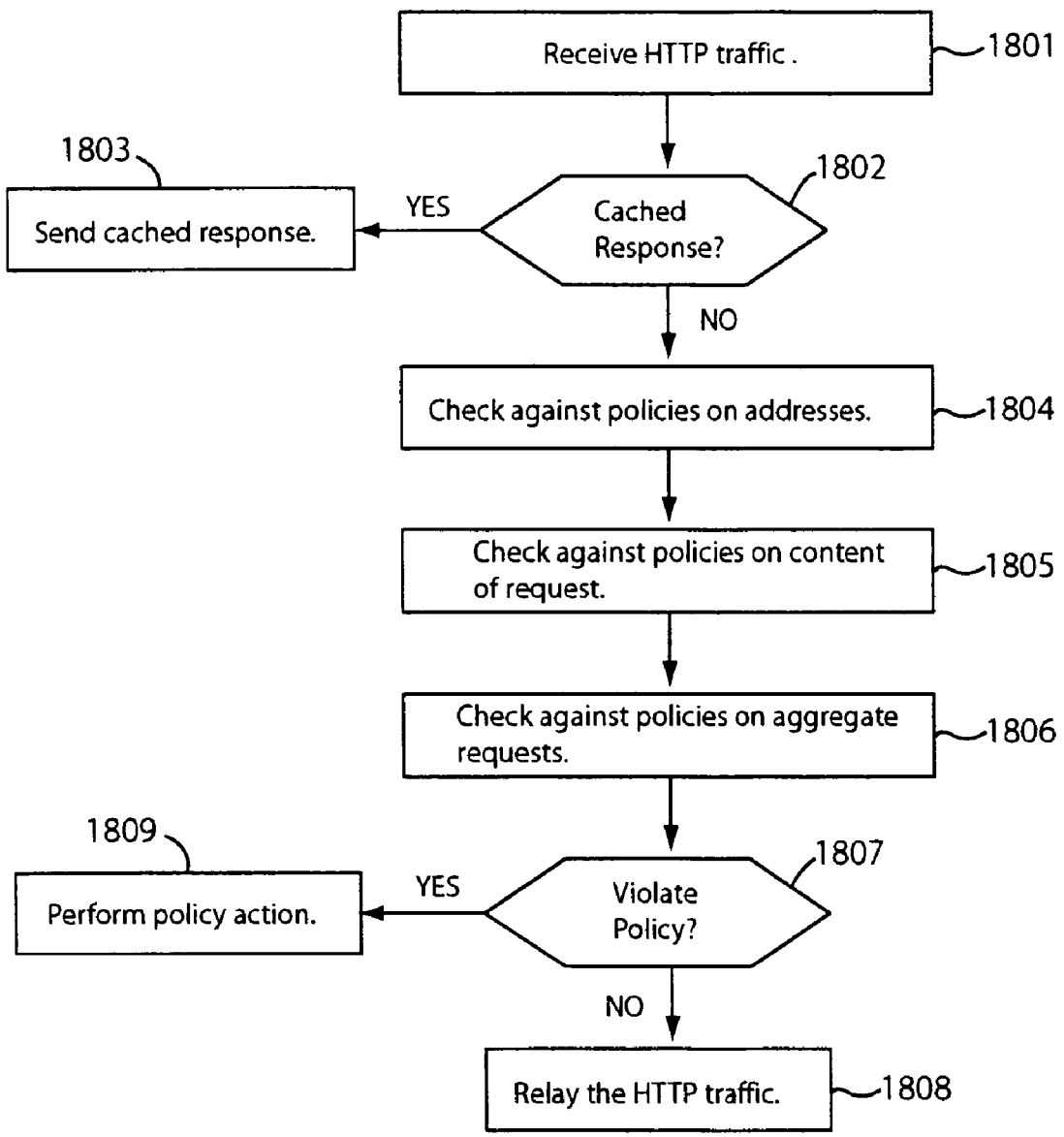
FIG. 18 shows a flow diagram of a method of analyzing an HTTP request in accordance with an embodiment of the present invention.

The flow diagram of FIG. 18 illustrates how the HTTP processor 1712 may analyze an HTTP request from a web client in accordance with an embodiment of the present invention. Once an HTTP request is captured by the HTTP transparent relay 1710 (block 1801), the HTTP request may be analyzed in at least four ways.

First, the HTTP request may be tested to see if there is a locally cached version of the response (block 1802). If a cached entry is found, it is removed from the pipeline, and the answer is inserted into the TCP stream at the correct time in the response stream (block 1803). Second, the HTTP request may be examined for policy violations based on the source and destination addresses (block 1804). For example, policies 1713 may indicate blocking of packets from particular web servers. Third, the HTTP request may be examined for policy violations based on the content of the request (block 1805). Fourth, the HTTP request may be examined for aggregate request policy violations (those based on the activity of the client and/or server over multiple requests) (block 1806). HTTP requests that do not violate any policy may be forwarded to the upstream web server (block 1807 to block 1808), while those that do are subjected to policy actions (block 1807 to block 1809), such as discarding or blocking. The HTTP transparent relay 1710 may next analyze the responses returned from the upstream server. An HTTP response comes in two parts: the reply header and the reply body. The body is in a format that is defined by the file type of the response URL.

HTTP Analysis

HTTP content analysis is, in general, widely understood. This section of the disclosure thus focuses on behavioral analysis of HTTP traffic.

Because it is practical in the case of an HTTP relay to store the basic information of all the commands and responses seen over an interval of multiple days, there are more analysis options than for the DNS case.

The HTTP processor 1712 may first check an incoming uniform resource locator (URL) against known bad URLs. If a known bad URL is detected, returning a substitute page or rejecting the connection is preferred. Analyzing the HTTP response data may also be useful. It is relatively easy to match URLs within a returned HTML (hypertext markup language) document to identify known bad URLs, for example.

The HTTP processor 1712 may receive the entire HTTP message before any of it is forwarded to the client. This allows the HTTP processor 1712 to analyze the message body for viruses using pattern matching algorithms, for example.

The HTTP processor 1712 may initiate on the fly calculations upon detection of frequent activities. For example, if someone is running a terminal session over an HTTP covert channel, there will be frequent commands to keep the interaction useful. Each client command may be time stamped and added to a rate filter. Normal HTTP traffic is expected to be bursty, so the HTTP processor 1712 may look for longer durations of commands. Each client/server pair may be assigned a data collection slot with multiple rate calculators of different time constants. When a pair is detected where the short to mid term rate ratio is within a window, the pair may be subjected to a long term analysis for more detailed evaluation.

The HTTP processor 1712 may also look for uncommon headers in HTTP messages. It is often common to hide the client to server data in the headers. The HTTP processor 1712 may record the number of times each HTTP command and response record is used, along with the number of times the first n client/server pairs use it. If there is a high ratio of pair use to total use, the pair may be subjected to a long term analysis.

A critical analysis is the occurrence of HTTP traffic that either correlates to or fails to correlate to other types of network activity. The action of a machine in e-mailing content to a spyware receiving system can trigger a detailed analysis of recent web traffic for a new source of infected web pages. The occurrence of web access without prior DNS queries would flag it for further investigation.

The long term analysis may be performed by the HTTP processor 712 by performing detailed frequency domain analysis on a given client server pair. The analysis proposes a set of timing relationship/transaction sets. It then does time domain analysis for each possibility, looking for correlations that don't show expected normal behavior. Known covert channels methods may be evaluated to determine the candidate selection process.

S-HTTP Relay

S-HTTP is an extension to the HTTP protocol (RFC 2660) to enable cryptographic authentication and encryption of HTTP commands and responses. In its usual mode, the server first sends a certificate that includes the public key of a server. The client then builds a query by first encrypting a session private encryption key in the server's public key, then the HTTP command encrypted with the session symmetric key. This is sent to the server. The server will encrypt the response in the same session symmetric key and send it back to the client.

To systems in the middle, the messages are cryptographically hard to decode. The only way to know the contents is to know the server private. This makes content analysis of the transactions very difficult. However, it is still possible to do behavioral analysis as in the HTTP case. The behavioral analysis may include message timing and correlation to other network behavior, such as DNS and email.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A network security system for processing e-mail transactions, the system comprising:
   an e-mail server on a first computer, the e-mail server being configured as a mail transfer agent;
   an SMTP e-mail client on a second computer;
   an SMTP transparent relay implemented separately from the first computer and the second computer, the SMTP transparent relay being configured to receive and process e-mail communications between the SMTP e-mail client and the e-mail server, the SMTP transparent relay being configured to examine the e-mail communications for network security policy violations, to perform policy actions on particular e-mail communications that violate a network security policy, and to relay particular e-mail communications that do not violate a network security policy; and
   a router configured to divert to the SMTP transparent relay the e-mail communications between the SMTP e-mail client and the e-mail server, the e-mail communications having a destination IP address of the SMTP e-mail client or a destination IP address of the e-mail server as received by the router and as transmitted by the router to the SMTP transparent relay,
   wherein the SMTP transparent relay includes a communications interface for each of the e-mail server and the SMTP e-mail client running in promiscuous mode.

2. The network security system of claim 1 wherein the SMTP transparent relay is configured to receive SMTP commands from the SMTP e-mail client and examine the SMTP commands for policy violations, perform policy actions on an SMTP command that violates a policy, and relay an SMTP command that do not violate a policy to the e-mail server.

3. The network security system of claim 1 wherein the SMTP transparent relay is configured to examine TCP packets initiating an e-mail connection between the SMTP e-mail client and the e-mail server for network security policy violations.

4. The network security system of claim 1 wherein the SMTP transparent relay is configured to examine SMTP responses from the e-mail server for network security policy violations.

5. The network security system of claim 1 wherein the policy actions include redirecting an e-mail communication to another computer.

6. A method of processing e-mail communications for network security, the method comprising:

transparently receiving in a computer configured as an SMTP transparent relay diverted e-mail packets originated by an SMTP e-mail client to be sent to an e-mail server, the e-mail server being configured as a mail transfer agent, each of the diverted e-mail packets having a destination IP address that does not correspond to any of the computer as received for processing by the computer, the SMTP transparent relay including a communication interface for each of the e-mail server and the SMTP client running in promiscuous mode;

in the computer, checking the diverted e-mail packets originated by the SMTP e-mail client for connection initiation packets configured to initiate an e-mail connection between the SMTP e-mail client and the e-mail server;

determining whether the connection initiation packets violate a first policy in a plurality of network security policies; and performing a first policy action on the connection initiation packets if the connection initiation packets violate the first policy.

7. The method of claim 6 wherein the first policy action comprises redirecting the connection initiation packets to another computer configured to analyze the connection initiation packets for network security threats.

8. The method of claim 6 further comprising:

checking the diverted e-mail packets originated by the SMTP e-mail client for SMTP command packets;

determining whether the SMTP command packets violate a second policy in the plurality of network security policies; and performing a second policy action on the SMTP command packets if the SMTP command packets violate the second policy.

9. The method of claim 8 wherein the second policy action comprises sending an error message to the e-mail client.

10. The method of claim 6 further comprising:

transparently receiving diverted e-mail packets originated by the e-mail server to be sent to the SMTP e-mail client;

checking the diverted e-mail packets originated by the e-mail server for SMTP response packets;

determining whether the SMTP response packets violate a third policy in the plurality of network security policies; and performing a third policy action on the SMTP response packets if the SMTP response packets violate the third policy.

11. The method of claim 10 wherein the third policy comprises a prohibition against malformed SMTP response packets to block covert channels and the third policy action comprises blocking the SMTP response packet.

12. A method of processing computer communications for network security, the method comprising:

transparently receiving in a computer configured as an SMTP transparent relay diverted packets between a client computer configured as an SMTP e-mail client and a server computer configured as a mail transfer agent communicating over a communication session in accordance with SMTP, the diverted packets having a destination IP address of either the client computer or the server computer as received in the computer configured as the SMTP transparent relay, the computer configured as the SMTP transparent relay including a communications interface in promiscuous mode for each of the client computer and the server computer;

monitoring the communication session between the client computer and the server computer by checking SMTP commands sent by the client computer to the server computer and responses by the server computer to the SMTP commands sent by the client computer at different states of the SMTP to check for network security policy violations; and relaying communications between the client computer and the server computer when the monitoring of the communication session does not indicate a network security policy violation.

* * * * *